(12) United States Patent
Chun et al.

(10) Patent No.: US 11,234,076 B2
(45) Date of Patent: Jan. 25, 2022

(54) APPARATUS AND METHOD FOR PROCESSING AUDIO SIGNAL

(71) Applicant: Samsung Electronics Co., Ltd., Gyeonggi-do (KR)

(72) Inventors: Young-Soo Chun, Gyeonggi-do (KR); Jungsik Park, Gyeonggi-do (KR)

(73) Assignee: Samsung Electronics Co., Ltd

( * ) Notice: Subject to any disclaimer, the term of this patent is extended or adjusted under 35 U.S.C. 154(b) by 302 days.

(21) Appl. No.: 16/325,104

(22) PCT Filed: Jul. 28, 2017

(86) PCT No.: PCT/KR2017/008136
§ 371 (c)(1),
(2) Date: Feb. 12, 2019

(87) PCT Pub. No.: WO2018/030687
PCT Pub. Date: Feb. 15, 2018

(65) Prior Publication Data
US 2021/0006901 A1 Jan. 7, 2021

(30) Foreign Application Priority Data
Aug. 12, 2016 (KR) .................. 10-2016-0103175

(51) Int. Cl.
*H04R 3/04* (2006.01)
*H04B 1/10* (2006.01)
(Continued)

(52) U.S. Cl.
CPC ............ *H04R 3/04* (2013.01); *H04B 1/10* (2013.01); *H04B 3/54* (2013.01); *H04B 15/00* (2013.01);
(Continued)

(58) Field of Classification Search
CPC . H04R 3/04; H04R 3/005; H04R 5/04; H04R 2420/09; H04B 3/54; H04B 1/10; H04B 15/00; H04L 25/00
(Continued)

(56) References Cited

U.S. PATENT DOCUMENTS 5,732,143 A 3/1998 Andrea et al.
6,160,893 A 12/2000 Saunders et al.
(Continued)

FOREIGN PATENT DOCUMENTS

CN 1234895 11/1999
CN 201481447 5/2010
(Continued)

OTHER PUBLICATIONS

Chinese Office Action dated Mar. 2, 2020 issued in counterpart application No. 201780049477.0, 16 pages.
(Continued)

*Primary Examiner* — William A Jerez Lora
(74) *Attorney, Agent, or Firm* — The Farrell Law Firm, P.C.

(57) ABSTRACT

Various examples of the present invention relate to an apparatus and a method for removing noise from a reception signal and a transmission signal. A method for operating a sound system for removing noise from a reception signal and a transmission signal, according to an example of the present invention comprises the steps of: receiving power through a first path from another electronic device; receiving a plurality of signals including transmission signals from a plurality of microphones; generating first data by multiplexing the plurality of received signals on the basis of the received power; and transmitting, through the first path, the generated first data to the other device. In addition, other various examples are possible.

5 Claims, 13 Drawing Sheets

(51) Int. Cl.
  *H04B 3/54*  (2006.01)
  *H04B 15/00* (2006.01)
  *H04R 3/00*  (2006.01)
  *H04R 5/04*  (2006.01)
(52) U.S. Cl.
  CPC ............... *H04R 3/005* (2013.01); *H04R 5/04* (2013.01); *H04R 2420/09* (2013.01)
(58) Field of Classification Search
  USPC .................................. 381/98, 119, 123, 124
  See application file for complete search history.

(56) References Cited

U.S. PATENT DOCUMENTS

| 7,416,828 | B2 | 8/2008 | Kurosu | |
|---|---|---|---|---|
| 2001/0053228 | A1* | 12/2001 | Jones | H04R 1/1083 381/71.6 |
| 2011/0116646 | A1 | 5/2011 | Sander et al. | |
| 2012/0177213 | A1* | 7/2012 | Le Faucheur | H04R 1/1083 381/71.6 |
| 2015/0237435 | A1 | 8/2015 | Wong et al. | |
| 2016/0007113 | A1 | 1/2016 | Garreau et al. | |
| 2016/0127815 | A1* | 5/2016 | Ookuri | H04R 1/06 381/119 |
| 2016/0249127 | A1* | 8/2016 | Kim | G10K 11/178 |

FOREIGN PATENT DOCUMENTS

| CN | 102726061 | 10/2012 |
|---|---|---|
| CN | 103260105 | 8/2013 |
| CN | 105144745 | 12/2015 |
| CN | 205092949 | 3/2016 |
| CN | 105554606 | 5/2016 |
| CN | 205305067 | 6/2016 |
| CN | 105554606 | 3/2019 |
| EP | 2 654 168 | 10/2013 |
| KR | 1020140132660 | 11/2014 |
| KR | 1020150041828 | 4/2015 |
| KR | 101520774 | 5/2015 |
| KR | 101529253 | 6/2015 |
| KR | 1020150076140 | 7/2015 |
| KR | 1020150123851 | 11/2015 |
| KR | 101584345 | 1/2016 |
| KR | 1020160033490 | 3/2016 |
| KR | 101609194 | 4/2016 |

OTHER PUBLICATIONS

Chinese Office Action dated Dec. 1, 2020 issued in counterpart application No. 201780049477.0, 13 pages.
European Search Report dated Apr. 8, 2019 issued in counterpart application No. 17839705.5-1219, 7 pages.
PCT/ISA/210 Search Report issued on PCT/KR2017/008136 (pp. 5).
PCT/ISA/237 Written Opinion issued on PCT/KR2017/008136 (pp. 5).
Chinese Office Action dated Apr. 2, 2021 issued in counterpart application No. 201780049477.0, 18 pages.
European Search Report dated Apr. 15, 2021 issued in counterpart application No. 17839705.5-1205, 7 pages.

* cited by examiner

APPARATUS AND METHOD FOR PROCESSING AUDIO SIGNAL

PRIORITY

This application is a National Phase Entry of International Application No. PCT/KR2017/008136, which was filed on Jul. 28, 2017, and claims priority to Korean Patent Application No. 10-2016-0103175, which was filed on Aug. 12, 2016, the contents of each of which are incorporated herein by reference.

TECHNICAL FIELD

Various embodiments of the present disclosure relate to an apparatus and method for processing an audio signal. Particularly, they relate to an apparatus and method for removing noise from a transmission signal and a reception in a sound system not embedded with a separate power source.

BACKGROUND ART

Despite an electronic device including a separate speaker, there are many cases in which a sound system is connected to the electronic device for the purpose of prevention of noise generation to the periphery, higher sound quality, etc.

Also, in recent years, a sound system supporting an active noise canceling (ANC) technology is being put on the market. Here, the ANC technology refers to a technology of offsetting noise intended to be removed along with other noise by using the principle of superposition of wave and interference. The sound system put on the market by employing the conventional ANC technology is mostly a sound system mounting an RX ANC technology which is usable when a user listens to a counterpart's voice while listening to music or making a call, i.e., which is for removal of noise of a reception voice. Also, even some sound systems mounting a TX ANC technology for removal of noise of a user's transmission voice have been put on the market.

DISCLOSURE OF INVENTION

Technical Problem

To implement an ANC function in a conventional sound system, a separate power source (e.g., battery) is needed to be embedded within the sound system. That is, a user has to separately charge the sound system, and there is an inconvenience that portability is deteriorated because the user uses a sound system having an increased volume and weight.

Accordingly to this, there is a need for a sound system capable of providing a function of removing noise from a reception signal and a transmission signal, to increase a user's convenience, and receiving power for a function of removing noise from an external device, thereby reducing a volume and weight.

Various embodiments of the present disclosure may provide an apparatus and method for removing noise from a reception signal and a transmission signal.

An embodiment of the present disclosure is to provide an apparatus and method for removing noise from a reception signal and a transmission signal, in a sound system not embedded with a separate power source.

An embodiment of the present disclosure is to provide an apparatus and method for generating first data by multiplexing a plurality of signals including transmission signals from a plurality of microphones, on the basis of power provided from another electronic device through a first path, and transmitting through the first path to the another electronic device, in a sound system not embedded with a separate power source.

An embodiment of the present disclosure is to provide an apparatus and method for supplying power through a first path to a sound system, and generating a plurality of signals including transmission signals by demultiplexing first data received through the first path from the sound system, and removing noise from the transmission signals.

Solution to Problem

According to an embodiment of the present disclosure, a sound system for removing noise from a reception signal and a transmission signal includes a control unit, and a plurality of microphones operatively coupled with the control unit. The control unit is configured to generate first data by multiplexing a plurality of signals including transmission signals from the plurality of microphones, on the basis of power provided from another electronic device through a first path, and is configured to transmit the generated first data, through the first path, to the another electronic device.

According to an embodiment of the present disclosure, an electronic device coupled with a sound system so as to remove noise from a reception signal and a transmission signal includes a processor supplying power through a first path to a sound system, a power line communication unit generating a plurality of signals including transmission signals by demultiplexing first data received through the first path from the sound system, and a noise removal unit generating at least one sound signal by removing noise from the transmission signals.

According to an embodiment of the present disclosure, a method for operating in a sound system for removing noise from a reception signal and a transmission signal includes receiving power from another electronic device through a first path, receiving a plurality of signals including transmission signals from a plurality of microphones, and generating first data by multiplexing the plurality of received signals, on the basis of the received power, and transmitting the generated first data through the first path to the another electronic device.

According to an embodiment of the present disclosure, a method for operating in an electronic device coupled with a sound system so as to remove noise from a reception signal and a transmission signal includes supplying power through a first path to a sound system, generating a plurality of signals including transmission signals by demultiplexing first data received through the first path from the sound system, and generating at least one sound signal by removing noise from the transmission signals.

Advantageous Effects of the Invention

According to an embodiment of the present disclosure, it may provide a clear sound that noise is removed from a transmission signal and a reception signal, without deteriorating of basic audio performance, by performing power reception and data communication through one path coupled with another electronic device, in a sound system not embedded with a separate power source. Also, there is an advantage in which because the separate power source is not needed to be embedded in the sound system, there is not a trouble in which a user has to separately charge the sound system, and a weight and volume of the sound system may be reduced.

BEST MODE FOR CARRYING OUT THE INVENTION

Figure 1:
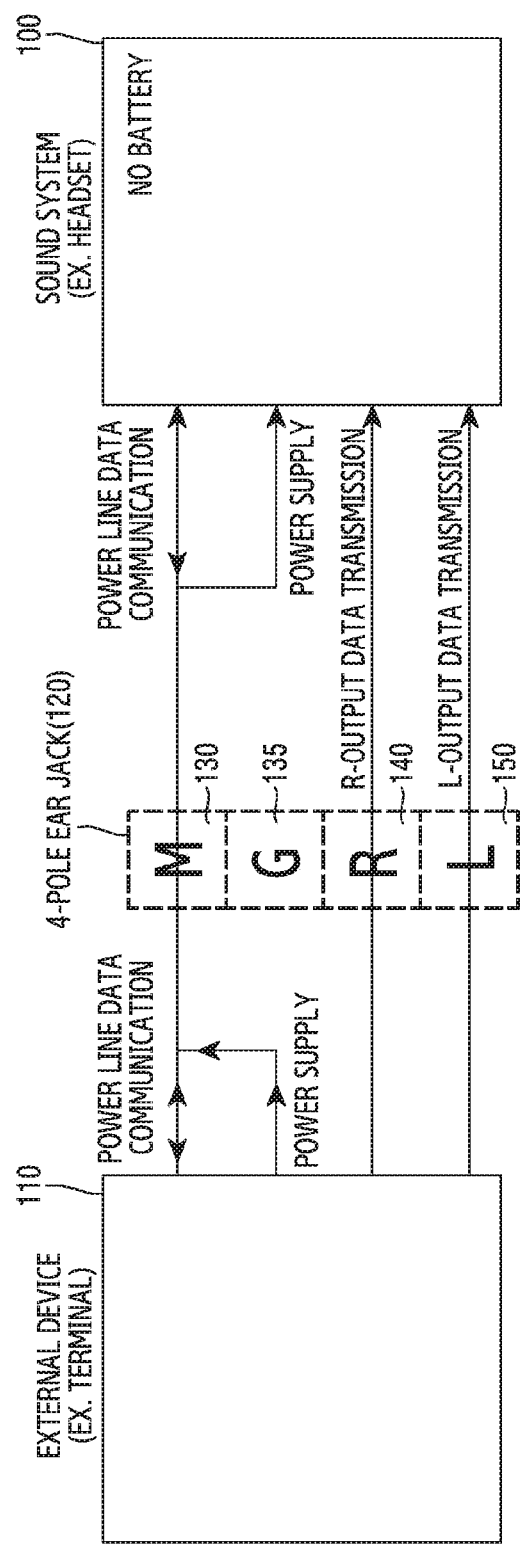
FIG. 1 is a construction diagram of a system including a sound system and an external device of an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure. The terms used herein are defined in consideration of functions of the present disclosure and may vary depending on a user's or an operator's intension and usage. Therefore, the terms used herein should be understood based on the descriptions made herein. It is to be understood that the singular forms "a," "an," and "the" include plural referents unless the context clearly dictates otherwise. In the present disclosure, an expression such as "A or B," "at least one of A and B," or "one or more of A and B" may include all possible combinations of the listed items. Expressions such as "first," "second," "primarily," or "secondary," as used herein, may represent various elements regardless of order and/or importance and do not limit corresponding elements. The expressions may be used for distinguishing one element from another element. When it is described that an element (such as a first element) is "(operatively or communicatively) coupled" to or "connected" to another element (such as a second element), the element can be directly connected to the other element or can be connected through another element (such as a third element).

An expression "configured to (or set)" used in the present disclosure may be used interchangeably with, for example, "suitable for," "having the capacity to," "designed to," "adapted to," "made to," or "capable of" according to a situation. A term "configured to (or set)" does not only mean "specifically designed to" by hardware. Alternatively, in some situations, the expression "apparatus configured to" may mean that the apparatus "can" operate together with another apparatus or component. For example, a phrase "a processor configured (or set) to perform A, B, and C" may be a generic-purpose processor (such as a Central Processing Unit (CPU) or an application processor) that can perform a corresponding operation by executing at least one software program stored at an exclusive processor (such as an embedded processor) for performing a corresponding operation or at a memory device.

An electronic device according to embodiments of the present disclosure, may be embodied as, for example, at least one of a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), an MPEG 3 (MP3) player, a medical equipment, a camera, and a wearable device. The wearable device can include at least one of an accessory type (e.g., a watch, a ring, a bracelet, an ankle bracelet, a necklace, glasses, a contact lens, or a Head-Mounted-Device (HMD)), a fabric or clothing embedded type (e.g., electronic garments), a body attachable type (e.g., a skin pad or a tattoo), and an implantable circuit. The electronic device may be embodied as at least one of, for example, a television, a Digital Versatile Disc (DVD) player, an audio device, a refrigerator, an air-conditioner, a cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, and an electronic frame.

In another embodiment, the electronic device may be embodied as at least one of various medical devices (such as, various portable medical measuring devices (a blood sugar measuring device, a heartbeat measuring device, a blood pressure measuring device, or a body temperature measuring device), a Magnetic Resonance Angiography (MRA) device, a Magnetic Resonance Imaging (MRI) device, a Computed Tomography (CT) device, a scanning machine, and an ultrasonic wave device), a navigation device, a Global Navigation Satellite System (GNSS), an Event Data Recorder (EDR), a Flight Data Recorder (FDR), a vehicle infotainment device, electronic equipment for ship (such as, a navigation device for ship and gyro compass), avionics, a security device, a head unit for a vehicle, an industrial or home robot, a drone, an Automated Teller Machine (ATM) of a financial institution, a Point Of Sales (POS) device of a store, and an Internet of Things (IoT) device (e.g., a light bulb, various sensors, a sprinkler device, a fire alarm, a thermostat, a street light, a toaster, sports equipment, a hot water tank, a heater, and a boiler). According to an embodiment, the electronic device may be embodied as at least one of a portion of furniture, building/construction or vehicle, an electronic board, an electronic signature receiving device, a projector, and various measuring devices (e.g., water supply, electricity, gas, or electric wave measuring device). An electronic device, according to an embodiment, can be a flexible electronic device or a combination of two or more of the foregoing various devices. An electronic device, according to an embodiment of the present disclosure, is not limited to the foregoing devices may be embodied as a newly developed electronic device. The term "user", as used herein, can refer to a person using an electronic device or a device using an electronic device (e.g., an artificial intelligence electronic device).

FIG. 1 is a construction diagram of a system including a sound system and an external device of an embodiment of the present disclosure.

Referring to FIG. 1, the system may include a sound system 100, an external device 110 coupled with the sound system 100, and a 4-pole ear jack 120 coupling the sound system 100 and the external device 110. According to an embodiment, the sound system 100 may be a sound system not embedded with a battery, and supporting an ANC function and a PLC function. Here, a power line communication (PLC) technology refers to a function of being capable of, by using a power line for supplying power, modulating a voice and data, and loading the voice and data on a frequency signal and forwarding together with power, to give and take information in both directions. According to an embodiment of the present disclosure, the sound system 100 and the external device 110 may support the PLC technology. According to another embodiment, the sound system 100 may include two or more microphones in order to support the ANC function. The sound system 100 may include two or more microphones and a speaker for outputting sound, and the sound system 100 may be a headset or an earphone.

The external device 110 may be an electronic device that is coupled with the sound system 100 through the 4-pole ear jack 120. For example, the external device 110 may be a portable terminal, a computer, and a tablet PC. The external device 110 of an embodiment of the present disclosure may be an electronic device that supports the PLC function and the ANC function.

The ear jack 120 may couple the sound system 100 and the external device 110. The ear jack 120 may be constructed in the 4-pole standard. That is, the internal of the ear jack 120 may be constructed as four terminals such as an M-stage 130, a G-stage 135, an R-stage 140, and an L-stage 150. A microphone signal may be transmitted through the M-stage 130. The microphone signal may be data muxing and encoding a plurality of signals including a user's voice signal at calling. Also, an audio signal may be transmitted through the R-stage 140 and the L-stage 150. The audio signal may be a counterpart's voice signal at calling. The G-stage 135 may perform a role of taking the ground level.

Though not illustrated, the coupling of the sound system 100 and the external device 110 may be performed by any one of the ear jack 120 or a USB type interface. The respective terminals (the M-stage 130, the G-stage 135, the R-stage 140, and the L-stage 150) of the ear jack 120 correspond to USB type receptacle pins respectively, and may each perform the same role.

According to an embodiment of the present disclosure, power line data communication and power supplying may be performed through one same line. However, in the drawing, it has been expressed by two lines for conceptual description convenience's sake.

According to an embodiment of the present disclosure, the ear jack 120 may be inserted into the inside of the external device 110. However, in the drawing, the ear jack 120 has been illustrated outside the external device 110 for description convenience's sake.

The sound system 100 of various embodiments of the present disclosure is not embedded with a battery, so there is a need to receive power from the external device 110 in order to perform the ANC function. That is, as the sound system 100 and the external device 110 support the PLC function, the both devices may perform power supplying, reception and data communication through one path. In other words, the sound system 100 may not only transmit a microphone signal through the M-stage 130 but also receive power, and the external device 110 may not only receive the microphone signal through the M-stage 130 but also supply power.

Figure 2A:
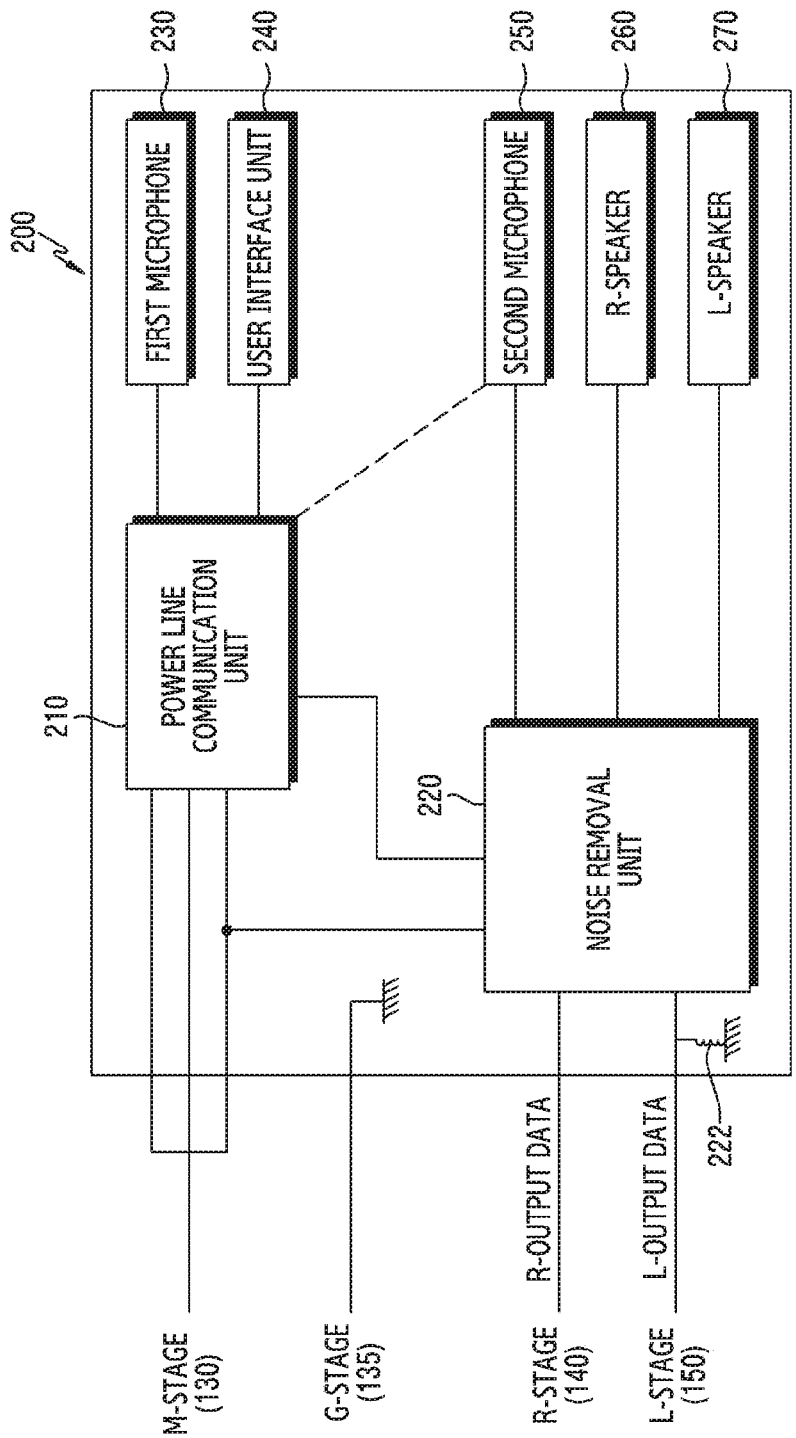
FIG. 2A is a block diagram of a sound system of an embodiment of the present disclosure.

FIG. 2A is a block diagram of a sound system 200 of an embodiment of the present disclosure.

Referring to FIG. 2A, the sound system 200 may include a power line communication unit 210, a noise removal unit 220, a first microphone 230, a user interface unit 240, a second microphone 250, an R-speaker 260, and an L-speaker 270. Here, at lease one of the first microphone 230, the second microphone 250, the R-speaker 260 and the L-speaker 270 may exist in plural as well.

The first microphone 230 may receive a first signal corresponding to a sound signal. The first signal may be a user's transmission voice. The transmission voice may include peripheral noise signal not wanted by a user. The second microphone 250 may receive a second signal corresponding to a sound signal, for removing a noise signal included in the first signal. A location of the second microphone 250 may be irrelevant left and right. The second signal may be a sound corresponding to the peripheral noise signal.

The user interface unit 240 may be a device for adjusting the output and input of a sound signal generated by the driving of the sound system 200. For example, the user interface unit 240 may be at least one or more buttons which are installed outside a headset. For example, the user interface unit 240 may be at least one or more buttons adjusting a function, etc. of an increase and decrease of a volume of a sound output, a muteness of the volume of the sound output, a movement and pause of a music track played at music playing, ON/OFF of an ANC function, etc. The user may perform the above-mentioned functions by using the user interface unit 240, even without using an input unit 360 of an external device.

The power line communication unit 210 may generate input data that will be transmitted to the external device 110, on the basis of power supplied through the M-stage 130 of the ear jack 120 from the external device 110. That is, the power line communication unit 210 may generate input data that will be transmitted to the external device 110 by multiplexing and encoding a sound signal inputted from the first microphone 230, a sound signal inputted through the noise removal unit 220 from the second microphone 250 and a signal inputted through the user interface unit 240, etc. Also, the power line communication unit 210 may transmit the generated input data to the external device 110 through the M-stage 130 of the ear jack 120. Here, as shown in the drawing by a dotted line, the second microphone 250 may be directly coupled to the power line communication unit 210 without going through the noise removal unit 220 as well.

The noise removal unit 220 may receive output data from the external device 110 through the R-stage 140 and L-stage 150 of the ear jack 120. Here, the output data may be a counterpart's voice, i.e., a reception voice signal at calling.

The process of receiving the output data may be performed at the same time as the process of transmitting the input data. That is, the process of receiving the output data and the process of transmitting the input data are not be performed sequentially according to the flow of time, but may be performed simultaneously at an arbitrary specific time.

The noise removal unit 220 may generate output data for removing peripheral noise, on the basis of power supplied from the external device 110 through the M-stage 130 of the ear jack 120. That is, by using second data received from the second microphone 250, the noise removal unit 220 may synthesize new output data for removing peripheral noise, with output data received through the R-stage 140 and L-stage 150 of the ear jack 150 from the external device 110. At this time, a peripheral noise removal degree of the new output data for removing the peripheral noise may be adjusted through a gain according to a user's convenience.

In accordance with an embodiment of the present disclosure, in response to a noise removal unit of the external device 110 not existing, the noise removal unit 220 of the sound system 200 may instead perform a TX ANC function. In detail, the noise removal unit 220 may receive a first signal through the first microphone 230 and the power line communication unit 210, and may receive a second signal through the second microphone 250. Thereafter, the noise removal unit 220 may generate the first signal from which noise is removed, by synthesizing a reverse-phased signal of the received second signal with the first signal, and may transmit the generated first signal through the power line communication unit 210 and the M-stage 130 to the external device 110.

Here, the active noise canceling (ANC) function may be applied to noise removal. The ANC function means a function of sensing external noise by using a plurality of sound signals including the external noise, and applying the sensed external noise and the reverse-phased signal, to remove the external noise. In an embodiment of the present disclosure, it may apply the reverse-phased signal of the second signal corresponding to the external noise. In response to output data being divided into R and L signals, the noise removal unit 220 may apply the reverse-phased signal of the second signal to each of the R and L signals.

A line which passes through the L-stage 150 for receiving L-output data may be coupled with a resistor 222 coupled with the ground. The resistor 222 may be a resistor for varying a voltage that is sensed by a processor 340 of the external device 110, in response to the sound system 200 being coupled to the external device 110.

The R-speaker 260 may output a signal which adds a reverse-phased signal of a noise signal to R-output data received from the external device 110.

The L-speaker 270 may output a signal which adds the reverse-phased signal of the noise signal to L-output data received from the external device 110.

Though not illustrated, in response to the sound system 200 including a control unit, the noise removal unit 220 and the power line communication unit 210 may be included in the control unit of the sound system 200.

Figure 2B:
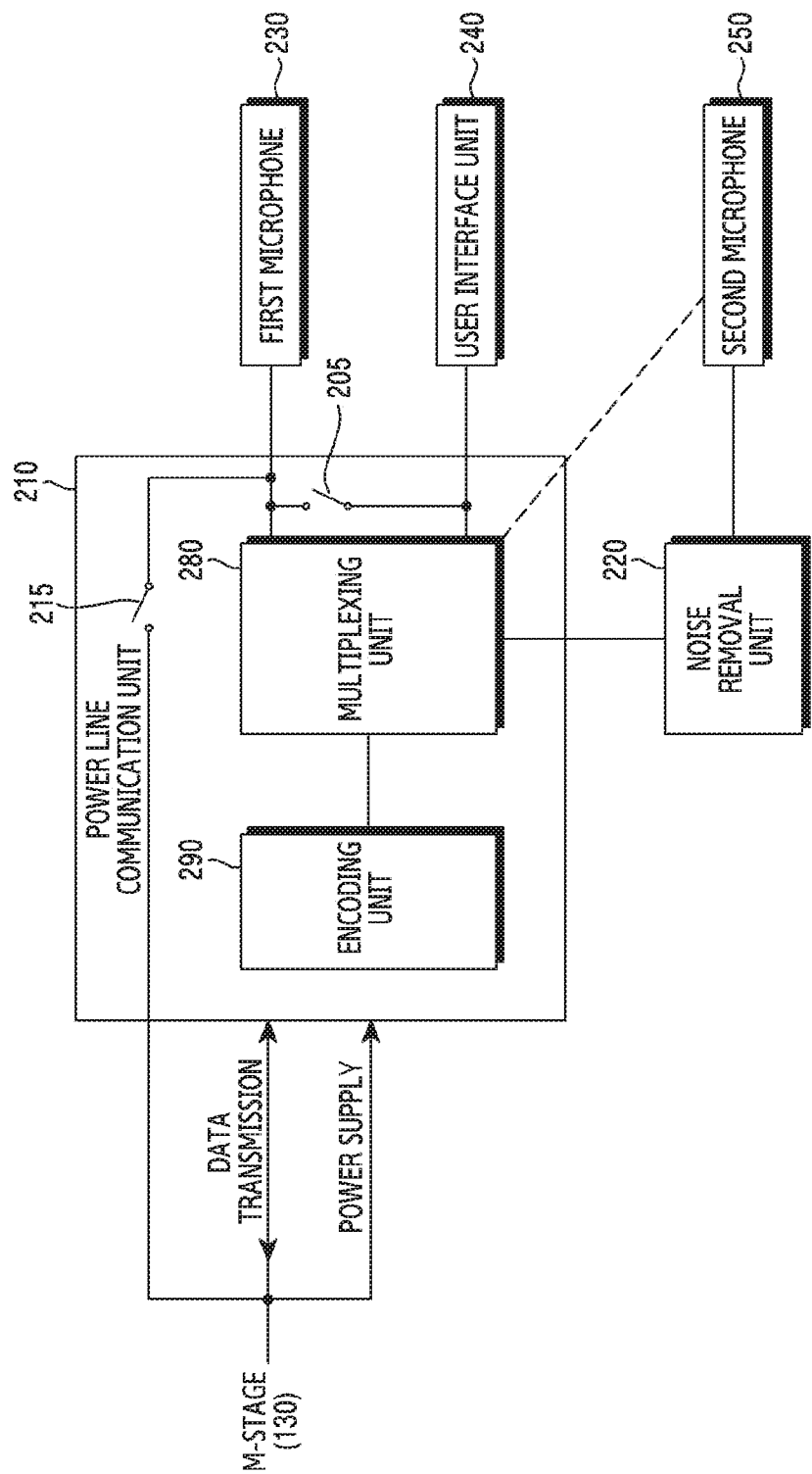
FIG. 2B is a detailed block diagram of a power line communication unit of a sound system of an embodiment of the present disclosure.

FIG. 2B is a detailed block diagram of a power line communication unit of a sound system of an embodiment of the present disclosure.

Referring to FIG. 2B, the power line communication unit 210 may include a multiplexing unit 280 and an encoding unit 290.

In accordance with various embodiments of the present disclosure, in response to sensing coupling through the 4-pole ear jack 120, the power line communication unit 210 may be powered on by receiving power through the M-stage 130 from the external device 110. That is, in response to a power source not being applied to the power line communication unit 210, the power line communication unit 210 may be in a power off state. At this time, a first signal and a signal by a user interface may be transmitted to the external device 110 through a separate path (a bypass circuit) of the power line communication unit 210. For example, the power line communication unit 210 may include the bypass circuit. The bypass circuit may include a microphone bypass switch 215 and a user interface bypass switch 205. The microphone bypass switch 215 and the user interface bypass switch 205 may have a closed state as a default state.

In accordance with various embodiments of the present disclosure, in response to a power source not being applied to the power line communication unit 210, the microphone bypass switch 215 and the user interface bypass switch 205 may be in a closed state, and microphone and user interface bypass circuits may be short circuits. Accordingly, the first signal and the signal by the user interface may be transmitted to the external device 110 through the bypass circuit of the power line communication unit 210. In response to being coupled with the external device 110 through the 4-pole ear jack 120, the microphone bypass switch 215 and the user interface bypass switch 205 are opened while the microphone and user interface bypass circuits are opened, under the control of the power line communication unit 210. Also, the powered-on power line communication unit 210 may receive power through the M-stage 130 from the external device 110, thereby performing power line data communication. That is, the power line communication unit 210 may be powered on by receiving power through the M-stage 130 from the external device 110, and the first signal and the signal by the user interface, etc. may be transmitted to the external device 110 through the encoding unit 290 and the M-stage 130, not the bypass circuit of the power line communication unit 210.

In accordance with another embodiment of the present disclosure, power line data communication carried out by the power line communication unit 210 and by the external device 110 may include transmission and/or reception of a PLC identifying signal for identifying whether the sound system 200 supports a PLC function and a response signal.

For example, to identify whether the coupled sound system 200 supports the PLC function, a processor 340 of an external device 300 sensing the coupling of the sound system 200 may transmit an identifying signal through the M-stage 130. Also, in response to the identifying signal, the power line communication unit 210 of the sound system 200 may transmit a separate response signal through the M-stage 130.

The multiplexing unit 280 may receive a plurality of signals from a plurality of microphones of the sound system 200. For example, the multiplexing unit 280 may receive a first signal from the first microphone 230, and may receive a second signal from the second microphone 250, or through the noise removal unit 220 coupled with the second microphone 250. For example, in response to an RX ANC function of the sound system 200 being OFF, a power source is not supplied to the noise removal unit 220, so the multiplexing unit 280 may directly receive the second signal from the second microphone 250.

Also, the multiplexing unit 280 may receive a signal by a user interface from the user interface unit 240. For example, the signal by the user interface may be at least one of signals on an increase and decrease of a volume of a sound output, a muteness of the volume of the sound output, a movement and pause of a music track played at music playing, and ON/OFF of an ANC function.

By multiplexing a plurality of received signals, the multiplexing unit 280 may generate one signal. The multiplexing refers to combining a plurality of signals in the form of a single complicated signal so as to use one communication path. Also, it may be shortly expressed as muxing. Here, the plurality of signals may include the first signal and the second signal, and may additionally include the signal by the user interface.

The encoding unit 290 may receive one signal multiplexed by the multiplexing unit 280. Thereafter, by encoding the received signal, the encoding unit 290 may generate input data that is one digital signal.

Figure 3A:
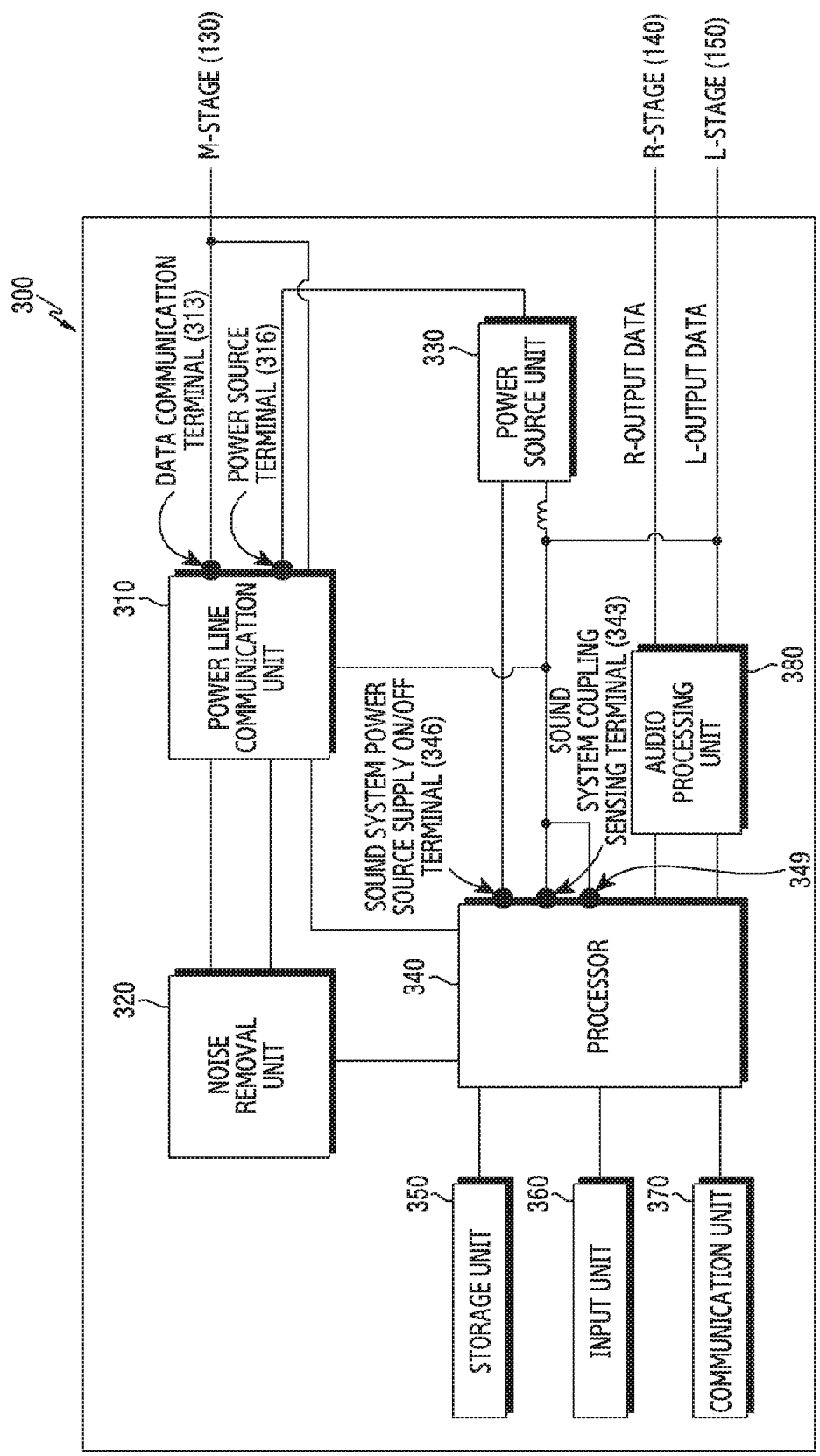
FIG. 3A is a block diagram of an external device of an embodiment of the present disclosure.

FIG. 3A is a block diagram of an external device of an embodiment of the present disclosure.

Referring to FIG. 3A, the external device 300 may include a power line communication unit 310, a noise removal unit 320, a power source unit 330, a processor, 340, a storage unit 350, an input unit 360, a communication unit 370, and an audio processing unit 380.

The power line communication unit 310 may perform data communication with the coupled sound system 200, through a data communication terminal 313 and the M-stage 130 of the ear jack 120. For example, the power line communication unit 310 may receive input data through the M-stage 130 of the ear jack 120 from the power line communication unit 210 of the coupled sound system 200. The input data is data multiplexing and encoding sound signals inputted from a plurality of microphones, but in response to the noise removal unit 320 of the external device 300 not existing, the input data may be a sound signal from which noise is removed by the sound system 200. For another example, the power line communication unit 310 may transmit, through the M-stage 130, a PLC identifying signal for sensing, by the processor 340, whether the coupled sound system 200 is a device supporting a PLC function.

The power line communication unit 310 may receive power through a power source terminal 316 from the power source unit 330. By using the received power, the power line communication unit 310 may perform a demultiplexing and decoding process. By performing the demultiplexing and decoding process, the power line communication unit 310 may generate a first signal and a second signal each received from the plurality of microphones of the sound system 200.

In the drawing, it has been illustrated that the power source unit 330 is located outside the power line communication unit 310, but the power source unit 330 may be included inside the power line communication unit 310 as well. That is, the power source unit 330 may be located outside the power line communication unit 310 to supply a power source to a power line communication unit circuit, or may be located inside the power line communication unit 310 to load power through the data communication terminal 313.

The noise removal unit 320 may receive a plurality of signals including a first signal and a second signal generated by the power line communication unit 310. Here, the first signal may be a user's transmission voice signal, and may include peripheral noise. Also, the second signal may be peripheral noise signal inputted from the second microphone 250 of the sound system. Also, by performing an ANC function for the first signal, the noise removal unit 320 may generate a sound signal from which noise is removed. For example, by applying a reverse-phased signal of the second signal to the first signal, the noise removal unit 320 may remove peripheral noise from the first signal.

The storage unit 350 may store a sound signal, etc. received from the sound system 200. For example, in response to a user performing a record command, the storage unit 350 may store a recorded user voice signal.

The input unit 360 may provide an input signal by a user to the processor 340. For example, the user may input a signal related to a call through the input unit 360. The input unit 360 may include one or more of a keypad including at least one hardware button, a touch screen for sensing touch information, and a touch pad.

The communication unit 370 may perform at least one communication function among voice communication and data communication. For example, the communication unit 370 may support a short range communication protocol (e.g., wireless fidelity (WiFi), Bluetooth (BT), near field communication (NFC) or network communication (e.g., Internet, a local area network (LAN), a wire area network (WAN), a telecommunication network, a cellular network, a satellite network or a plain old telephone service (POTS)).

The audio processing unit 380 may provide an audio interface between the external device 300 and the sound system 200.

The processor 340 may receive a sound signal from the coupled sound system 200, and a sound signal that will be outputted to the sound system 200, and process the received signals according to an operation intended to be performed. For example, the processor 340 may receive transmission and reception signals, and process the received signals according to an operation intended to be performed.

In case of a transmission signal, the processor 340 may receive the transmission signal from which external noise is removed from the noise removal unit 320, and process the received transmission signal. For example, in response to receiving a record command through the input unit 360, the processor 340 may receive a user's recorded voice from which noise is removed from the noise removal unit 320, and store the voice in the storage unit 350. For another example, in response to receiving a call command through the input unit 360, the processor 340 may receive a user's transmission voice from which noise is removed from the noise removal unit 320, and transmit the voice to a call counterpart through the communication unit 370.

In case of a reception signal, the processor 340 may transmit the reception signal through the audio processing unit 380 and the R-stage 140 and L-stage 150 of the ear jack 120 to the sound system 200. The processor 340 may transmit R-output data through the R-stage 140 of the ear jack 120 to the sound system 200, and may transmit L-output data through the L-stage 150 of the ear jack 120 to the sound system 200. The output data is not necessarily limited to a counterpart's voice at calling, and may be music or background music of a game according to an operation performed by the external device 300.

The processor 340 may receive a signal by a user interface from the power line communication unit 310, and perform an operation related with the received signal. The signal by the user interface may be at least one of signals on an increase and decrease of a volume of a sound output, a muteness of the volume of the sound output, a movement and pause of a music track played at music playing, and ON/OFF of an ANC function. As an example of an operation related with a received signal, in response to the processor 340 receiving a signal by a user interface for the increase of the volume of the sound output, the processor 340 may increase a volume of output data transmitted to the audio processing unit 380 and the sound system 200 coupled through the R-stage 140 and L-stage 150 of the ear jack 120.

The processor 340 may include two or more terminals coupled with the power source unit 330. The two or more terminals may include a sound system coupling sensing terminal 343 and a sound system power source supply ON/OFF terminal 346.

The sound system coupling sensing terminal 343 may be a terminal sensing whether the external device 300 is coupled with the sound system 200. In other words, in response to the external device 300 being coupled with the sound system 200 through the ear jack 120, the sound system coupling sensing terminal 343 may identify whether it is coupled with the sound system 200 through voltage variation.

Through the sound system power source supply ON/OFF terminal 346, the processor 340 may supply power to the sound system 200. For example, in response to identifying that the sound system 200 is coupled through the 4-pole ear jack 120, the processor 340 may turn on the sound system power source supply ON/OFF terminal 346, to enable the power source unit 330 to supply power to the sound system 200.

Through a pole number identifying terminal 349, the processor 340 may identify the number of poles of the coupled ear jack 120. For example, the processor 340 may identify whether the number of poles of the coupled ear jack is 3 poles or is 4 poles, on the basis of a value of a voltage measured by the pole number identifying terminal 349. According to an embodiment, in response to it being the 3-pole ear jack, because the M-stage 130 and the G-stage 135 are coupled with each other, the M-stage 130 may be recognized as the ground level and thus, it is recognized to be 3 poles. According to another embodiment, in response to it being the 4-pole ear jack, the M-stage 130 may be recognized to be a value not the ground level and thus, it is recognized to be 4 poles. According to a further embodiment, the processor 340 may perform sound system coupling sensing and pole number identifying, through the sound system coupling sensing terminal 343 as well.

The power source unit 330 may supply power to the external device 300 and the sound system 200. Though not illustrated, the power source unit 330 may include a plurality of power sources. The plurality of power sources may include a first power source and a second power source. The first power source may be used for sensing whether the sound system 200 is coupled with the external device 300, and may be coupled with the processor 340 through the sound system coupling sensing terminal 343. The second power source may be used for supplying power to the external device 300 and the sound system 200, and may be coupled with the processor 340 through the sound system power source supply ON/OFF terminal 346. That is, the second power source may be used for, in response to identifying that the sound system 200 is coupled through the 4-pole ear jack 120, supplying power to the power line communication unit 310 of the external device 300 and the power line communication unit 210 of the sound system 200.

The first power source is a power source for sensing the coupling of the sound system 200 and thus, may be continuously kept ON. The second power source may selectively become ON/OFF according to the coupling or non-coupling of the sound system 200. For example, in response to the coupled sound system 200 being separated, the second power source may become OFF.

Figure 3B:
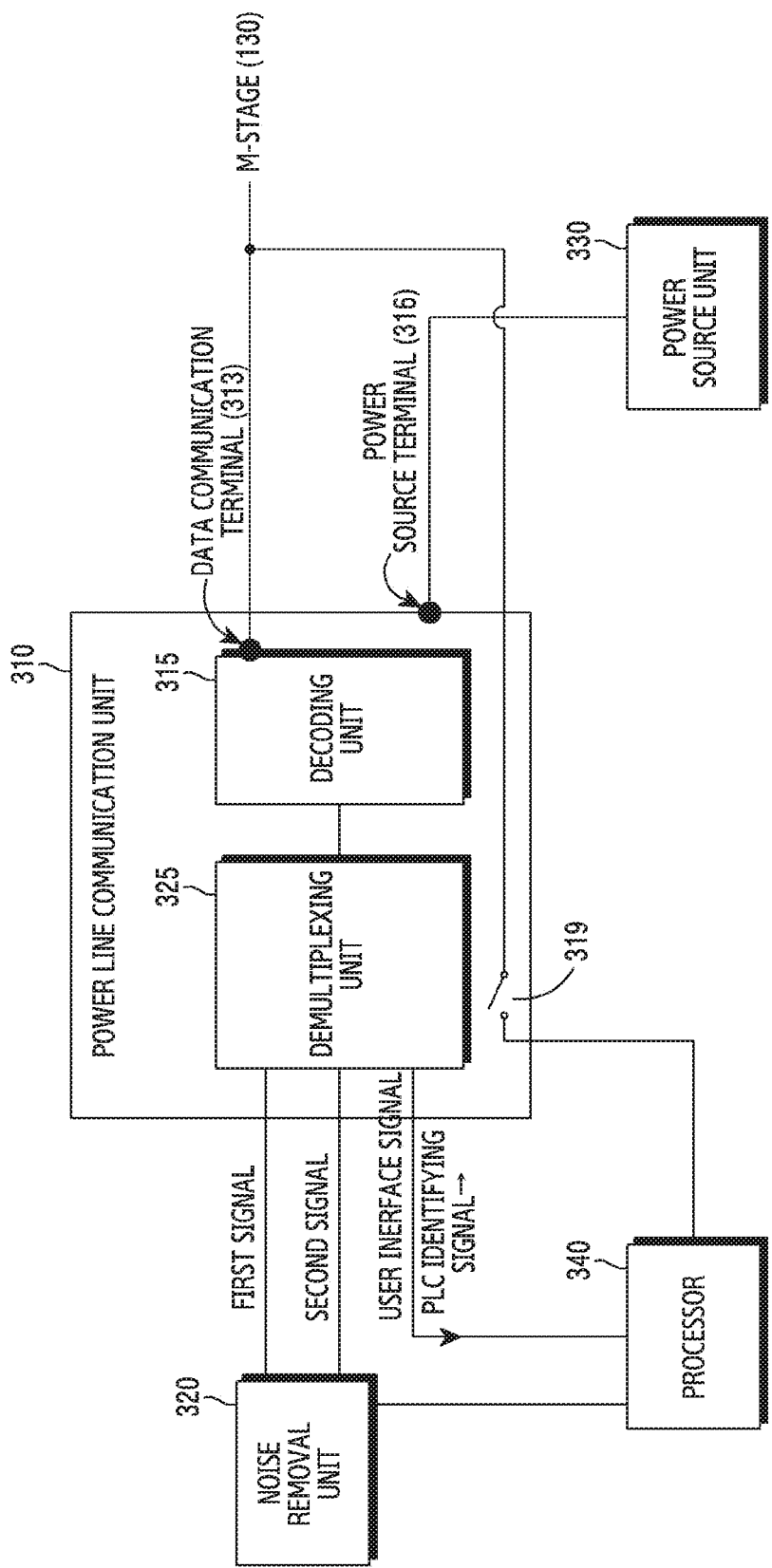
FIG. 3B is a detailed block diagram of a power line communication unit of an external device of an embodiment of the present disclosure.

FIG. 3B is a detailed block diagram of a power line communication unit of an external device of the present disclosure.

In FIG. 3A, a description has been made for the external device of an embodiment of the present disclosure, so, in FIG. 3B, a description is made aiming at a difference.

Referring to FIG. 3B, the power line communication unit 310 of the external device may include a decoding unit 315 and a demultiplexing unit 325.

In accordance with various embodiments of the present disclosure, the power line communication unit 310 may receive, through the power source terminal 316, power from the second power source of the power source unit 330. In response to the processor 340 sensing that the sound system 100 is coupled through the 4-pole ear jack 120, the processor 340 may turn on the second power source of the power source unit 330. Accordingly to this, the power line communication unit 310 may receive power from the second power source.

In the drawing, it has been illustrated that the power source unit 330 is located outside the power line communication unit 310, but the power source unit 330 may be included inside the power line communication unit 310 as well. That is, the power source unit 330 may be located outside the power line communication unit 310 to supply a power source to a power line communication unit circuit, or may be located inside the power line communication unit 310 to load power through the data communication terminal 313.

The power line communication unit 310 receiving power may receive input data from the power line communication unit 210 of the coupled sound system 200 through the M-stage 130 of the ear jack and the data communication terminal 313. The input data may be a digital signal that a user transmission voice and peripheral noise are multiplexed and encoded by the power line communication unit 210 of the sound system 200.

The decoding unit 315 may decode input data received through the data communication terminal 313. That is, the decoding unit 315 may generate data muxing a plurality of signals, by decompressing digital data compressed by the encoding unit 290 of the sound system 200.

The demultiplexing unit 325 may receive muxed data from the decoding unit 315, and perform demultiplexing. The demultiplexing is a technique of separating a multiplexed complicated signal. Also, it may be shortly expressed as demuxing as well. In one embodiment of the present disclosure, through the demultiplexing, the demultiplexing unit 325 may separate data muxing a first signal inputted from the first microphone 230 of the sound system and a second signal inputted from the second microphone 250, etc., into a plurality of signals. Also, the plurality of signals may include a signal by a user interface. In response to the signal by the user interface being included in the plurality of signals, the demultiplexing unit 325 may perform demultiplexing, to separate into the first signal and the second signal and the signal by the user interface.

The demultiplexing unit 325 may transmit a signal separated through the demultiplexing, to the noise removal unit 320 and the processor 340. The demultiplexing unit 325 may transmit a first signal and a second signal through a plurality of lines to the noise removal unit 320. The first signal may be a user transmission voice, and the second signal may be peripheral noise. Also, in response to the signal by the user interface being included in the plurality of signals, the demultiplexing unit 325 may transmit the signal by the user interface to the processor 340. Also, the processor 340 may perform an operation related with the received signal by the user interface.

The processor 340 may receive a signal by a user interface from the power line communication unit 310. Also, in response to the coupling of the sound system 200 through the 4-pole ear jack 120 being sensed, the processor 340 may transmit a PLC identifying signal of identifying whether it is a device supporting a PLC, to the power line communication unit 310.

The processor 340 may be coupled with the M-stage 130 through a bypass circuit. The bypass circuit may be a separate path in which a signal from the sound system is transmitted in response to the power line communication unit 310 being powered off.

The bypass circuit may include a bypass switch 319. In response to the power line communication unit 310 being powered off, the bypass switch 319 is closed and the bypass circuit is short-circuited. In response to the power line communication unit 310 being powered on, the bypass switch 319 is opened and the bypass circuit is opened. That is, in response to the power line communication unit 310 being powered off, the bypass circuit may perform a role as a transmission path of a signal from the sound system 100. A case that the power line communication unit 310 is powered off is a case of being coupled with the sound system 100 through the 3-pole ear jack, a case of, even though being coupled with the sound system 100 through the 4-pole ear jack, not being capable of sensing a PLC response signal, etc.

Figure 4:
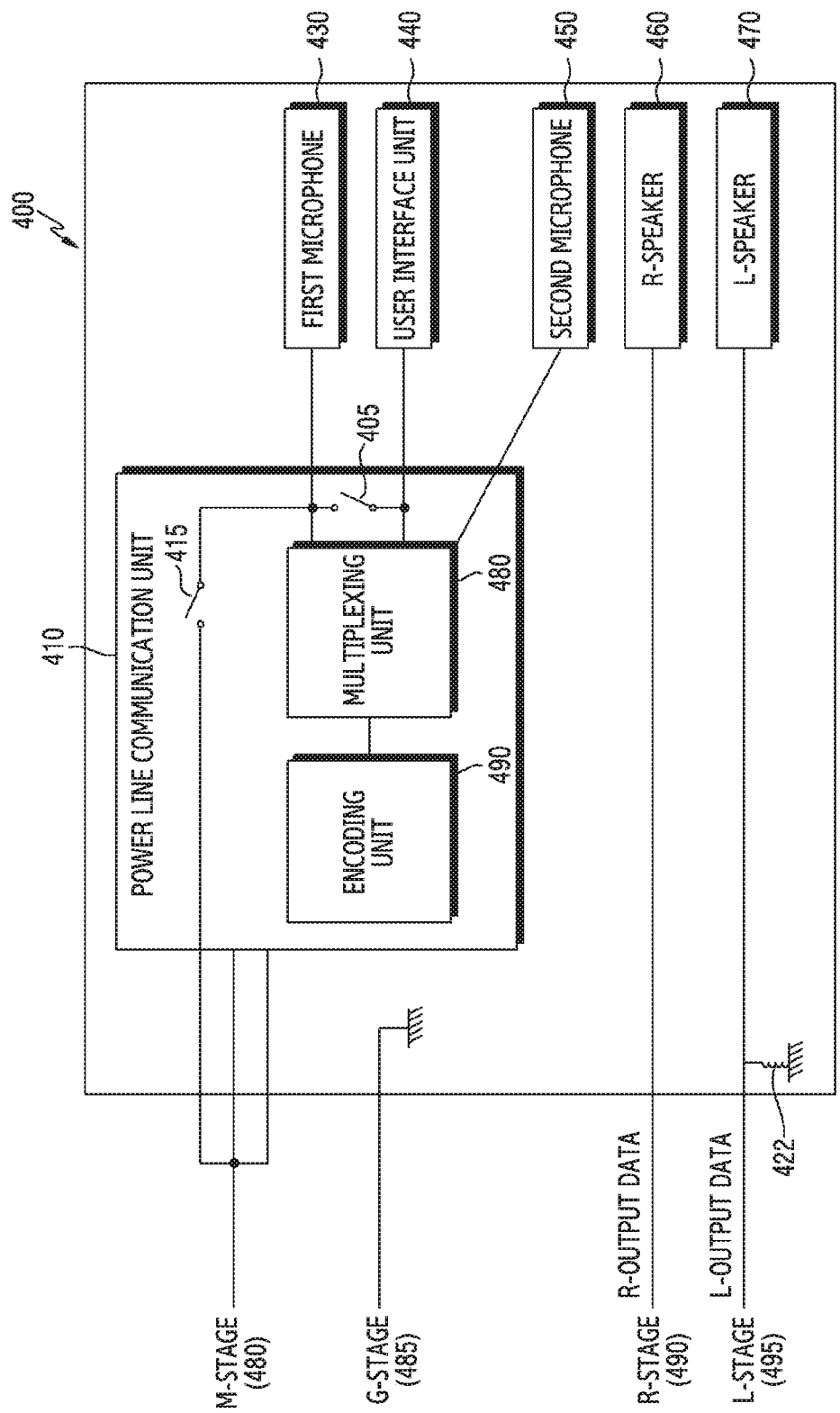
FIG. 4 is a block diagram of a sound system not having a noise removal unit of an embodiment of the present disclosure.

FIG. 4 is a block diagram of a sound system not having a noise removal unit of an embodiment of the present disclosure.

In FIGS. 2A and 2B, a description has been made for the sound system 200 having the noise removal unit 220, so a description is here made aiming at a difference with FIGS. 2A and 2B without describing all components of the drawing.

A power line communication unit 410 may generate input data that will be transmitted to the external device 110, on the basis of power supplied from the external device 110 through an M-stage 480 of the ear jack 120. At this time, in response to the noise removal unit not being included in the sound system 400, the power line communication unit 410 may be directly coupled with a second microphone 450 so as to receive a second signal included in the input data that will be transmitted to the external device 110.

In response to the noise removal unit 220 not being included in the sound system 400, the sound system 400 is not able to perform an RX ANC function. In this case, the RX ANC function may be instead performed by the external device 110. That is, output data transmitted from the external device 110 through an R-stage 490 and an L-stage 495 may be transmitted to an R-speaker 460 and an L-speaker 470 without going through the noise removal unit 220. At this time, the output data transmitted from the external device 110 may be output data for which the RX ANC function has been performed by the external device 110. That is, a noise signal inputted to the second microphone 450 and forwarded is converted by the external device 110 into a reverse-phased signal, and the reverse-phased signal is synthesized to an R signal or L signal, and the synthesized signal may be forwarded to the sound system 400.

Figure 5:
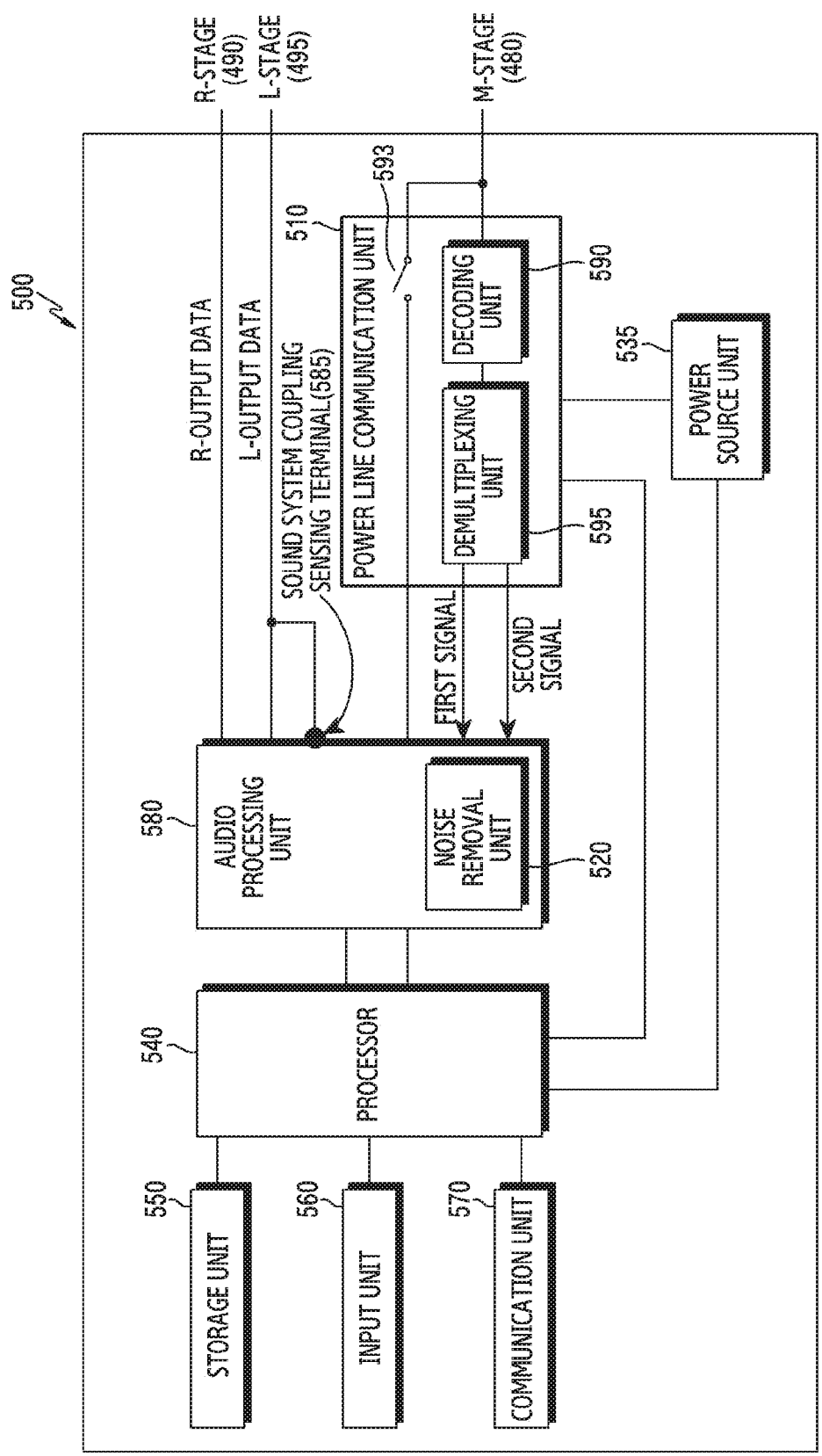
FIG. 5 is a detailed block diagram of an external device of an embodiment of the present disclosure.

FIG. 5 is a detailed block diagram of an external device of another embodiment of the present disclosure.

According to another embodiment of the present disclosure, a noise removal unit 520 of the external device 500 may be included in an audio processing unit 580. FIG. 5 shows a construction of the external device 500 in response to the noise removal unit 520 being included in the audio processing unit 580.

The audio processing unit 580 may include the noise removal unit 520. The audio processing unit 580 may include a sound system coupling sensing terminal 585 coupled with an L-stage 495. The audio processing unit 580 may sense whether the sound system 100 is coupled with the external device 100 through the sound system coupling sensing terminal 585. In response to sensing that the sound system 100 is coupled through the 4-pole ear jack, the audio processing unit 580 may transmit a related signal to the processor 540. The processor 540 receiving the related signal may supply power to the power line communication unit 510 and the sound system 100 through a power source unit 535.

The audio processing unit 580 may be directly coupled through a bypass circuit with an M-stage 480. The bypass circuit may include a bypass switch 593. In response to a power source not being applied to the power line communication unit 510 (power off), the bypass circuit may be short-circuited. For example, in response to the external device 500 failing to receive a response signal to a PLC signal from the coupled sound system 200, a signal (e.g., the first signal through the first microphone) transmitted through the M-stage 480 may be directly transmitted through the short-circuited bypass circuit to the audio processing unit 580, without being transmitted to a decoding unit 590 of the power line communication unit 510.

In accordance with another embodiment of the present disclosure, in response to the noise removal unit 220 of the sound system 200 not existing, the audio processing unit 580 may instead perform an RX ANC function. In detail, the audio processing unit 580 may receive a second signal (e.g., a peripheral noise signal) through the M-stage 480, and receive a reception signal from the processor 540. Thereafter, by synthesizing a reverse-phased signal of the second signal to the reception signal, the audio processing unit 580 may generate the reception signal for removing noise, and may transmit the generated reception signal through an R-stage 490 and the L-stage 495 to the sound system 200.

In accordance with a further embodiment of the present disclosure, in response to the noise removal unit 520 of the external device 500 not existing, the audio processing unit 580 may receive a transmission signal from which noise is previously removed by the sound system 200. That is, the audio processing unit 580 may receive a noise-removed transmission signal that is generated by performing, by the sound system 200, a TX ANC function. In detail, the noise removal unit 220 of the sound system 200 may generate a transmission signal from which noise is removed by applying a reverse-phased signal of a second signal (e.g., a peripheral noise signal) to a first signal. Thereafter, the audio processing unit 580 may receive the generated noise-removed transmission signal, from the power line communication unit 210 of the sound system 200, through the M-stage 480.

The external device 500 may include, in the audio processing unit 580 or the processor 540, an instruction for converting an audio data format necessary for input of the noise removal unit 520. As in FIG. 5, the noise removal unit 520 for removing noise in the converted audio data format may be located in the audio processing unit 580, and may be, although not illustrated, located in the processor 540 as well.

In accordance with various embodiments of the present disclosure, in response to an instruction for changing an audio data format existing in the audio processing unit 580, and the noise removal unit 520 existing in the processor 540, the audio processing unit 580 may convert data (a first signal and a second signal) received from the power line communication unit 510 into an audio format suitable to input of the noise removal unit 520. The converted first signal and second signal may be each inputted to the processor 540, and the noise removal unit 520 of the processor 540 may synthesize a reverse-phased signal of the second signal with the first signal, to remove noise from the first signal. The first signal from which the noise is removed may be forwarded through a communication unit 570 to the external, or be stored in a storage unit 550.

In accordance with another embodiment of the present disclosure, in response to the noise removal unit 220 of the sound system 200 not existing, the processor 540 may instead perform an RX ANC function. In detail, the audio processing unit 580 may receive a second signal (e.g., a peripheral noise signal) through the M-stage 480, and convert an audio format. Thereafter, by synthesizing a reverse-phased signal of the second signal to the reception signal, the processor 540 may generate a reception signal for removing noise, and may transmit the generated reception signal through the audio processing unit 540 through the R-stage 490 and the L-stage 495 to the sound system 200.

According to a further embodiment of the present disclosure, the processor 540 may include all of the audio processing unit 580 and the noise removal unit 520 as well.

An electronic device of various embodiments of the present disclosure may include a control unit, and a plurality of microphones operatively coupled with the control unit. The control unit may be configured to generate first data by multiplexing a plurality of signals including transmission signals from the plurality of microphones, using power provided from an external electronic device through a first path, and may be configured to transmit the generated first data, through the first path, to the external electronic device.

According to various embodiments, at least one of the plurality of microphones may be configured to receive a transmission signal, and another at least one may be configured to receive peripheral noise.

According to various embodiments, the device may further include at least one speaker operatively coupled with the control unit, and the control unit may be configured to generate at least one output data by synthesizing at least one noise removal signal for removing peripheral noise, with at least one reception signal received through at least one second path from the external electronic device, using the power provided from the external electronic device through the first path, and may be configured to transmit the generated at least one output data to the at least one speaker.

According to various embodiments, the control unit may be configured to generate the first data by multiplexing a signal by a user interface with the plurality of signals.

According to various embodiments, the signal by the user interface unit may include at least any one of signals of an increase or decrease of a volume, a movement of a music track, and turning ON or OFF a function of removing noise.

An electronic device of various embodiments of the present disclosure may include a processor configured to supply power through a first path to an external electronic device, a power line communication unit configured to generate a plurality of signals including transmission signals by demultiplexing first data received through the first path from the external electronic device, and a noise removal unit configured to generate at least one sound signal by removing noise from the transmission signals.

According to various embodiments, the processor may be configured to, in response to the external electronic device being coupled to the electronic device, identify the number of poles of an ear jack which is inserted into a set slot of the electronic device, and identify whether the external electronic device is a device supporting a function of power line communication through the first path, on the basis of the identified number of poles of the ear jack.

According to various embodiments, the device may further include a power source unit. In response to being identified that the external electronic device is the device supporting the function of power line communication through the first path, the processor may be configured to enable the power source unit to supply power to the power line communication unit, and supply power to the external electronic device through the first path.

According to various embodiments, the plurality of signals may further include a signal by a user interface unit.

According to various embodiments, the electronic device may be coupled with the external electronic device by any one of an ear jack or a USB type interface. According to various embodiments, in response to being an ear jack not supporting a PLC function, the external device may perform the same operation as the existing ear phone operation like a bypass mode of the power line communication unit.

According to various embodiments, a first signal (e.g., L signal, R signal) inputted to a plurality of microphones of the sound system may be a plurality of signals capable of being divided using a location difference of the microphones.

Figure 6:
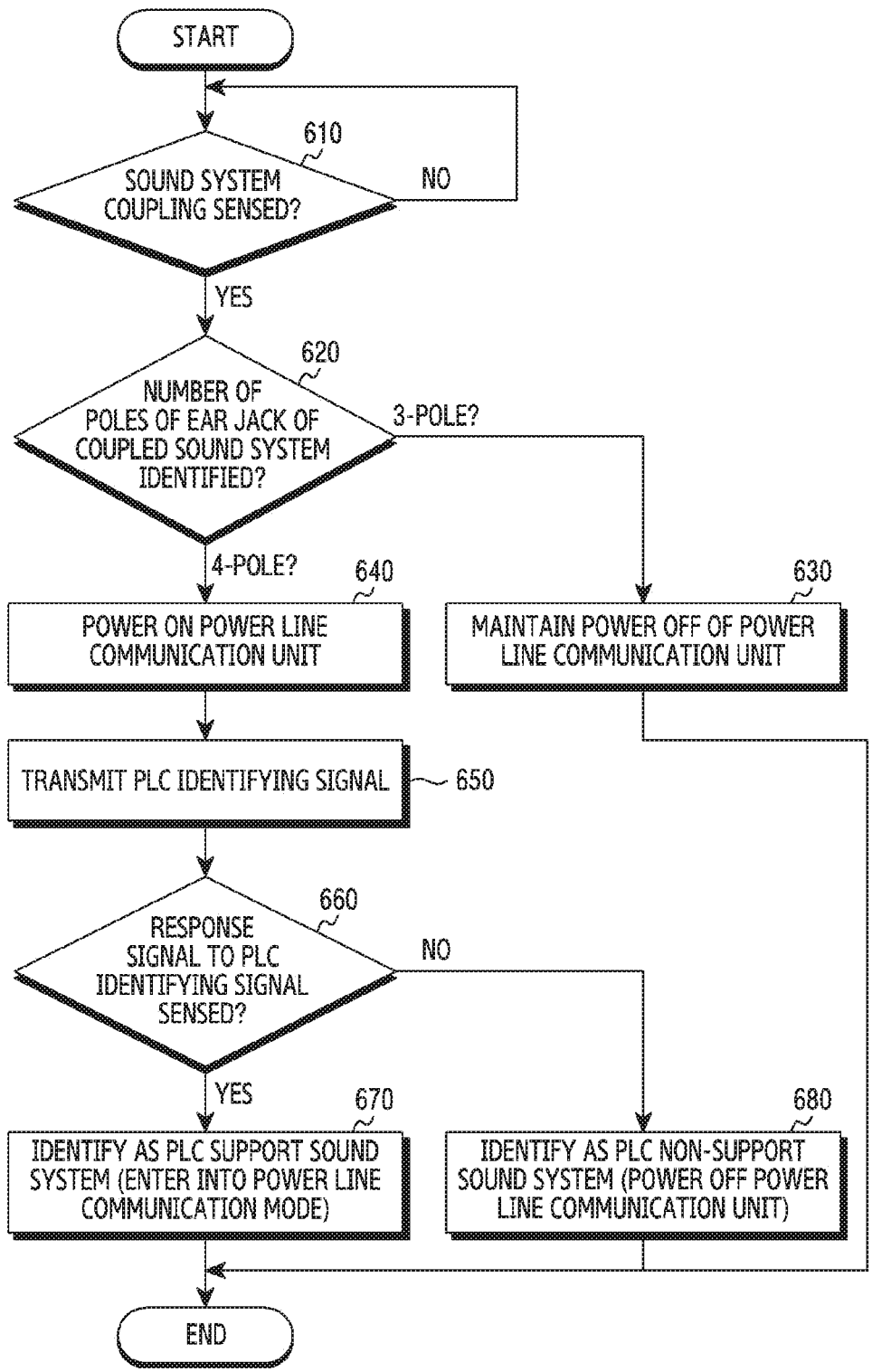
FIG. 6 is a flowchart illustrating an operation sequence of identifying, by a processor of an external device, whether a sound system supports a PLC function, of an embodiment of the present disclosure.

FIG. 6 is a flowchart illustrating an operation sequence of identifying, by the processor 340 of the external device, whether the sound system 100 supports a PLC function, of an embodiment of the present disclosure.

Firstly, as illustrated in FIG. 6, in operation 610, the processor 340 of the external device or the audio processing unit 580 may sense that the 4-pole ear jack 120 is inserted into a set slot, thereby sensing the coupling of the sound system 100. In detail, the processor 340 or the audio processing unit 580 may sense that the sound system 100 is coupled through a voltage variation value of the sound system coupling sensing terminal 585. In response to the coupling of the sound system 100 not being sensed, it may repeat operation 610. In response to the coupling of the sound system 100 being sensed, it may perform operation 620.

Thereafter, in operation 620, the processor 340 or the audio processing unit 580 may identify the number of poles of an ear jack of the coupled sound system 100. In response to being coupled with the sound system 100 having a 3-pole ear jack, the power line communication unit 510 of the external device does not apply a power source to the power line communication unit 210 of the sound system. That is, the processor 340 or the audio processing unit 580 may maintain a power off state of the power line communication unit 210 of the sound system through the power line communication unit 510 of the external device.

In response to being coupled through the 4-pole ear jack 120 with the sound system 100, in operation 640, the processor 340 or the audio processing unit 580 may power on the power line communication unit 210 of the sound system through the power line communication unit 510 of the external device. That is, by supplying power through the M-stage 130 to the sound system 100, the power line communication unit 510 of the external device may power on the power line communication unit 210 of the sound system.

That is, the processor 340 or the audio processing unit 580 may recognize the number of poles of the ear jack coupled with the sound system 100, and power on or power off the power line communication unit 210 of the sound system through the power line communication unit 510 of the external device according to the recognized number of poles of the ear jack.

In response to sensing the coupling of the 4-pole ear jack in operation 640, the processor 340 or the audio processing unit 580 may, in operation 650, transmit a PLC identifying signal through the power line communication unit 510 of the external device to the power line communication unit 210 of the sound system. Also, the power line communication unit 210 of the powered-on sound system may receive the PLC identifying signal and, in response to supporting a PLC function, may transmit a PLC identifying response signal to the external device 110.

The PLC identifying response signal may include information of the sound system 100. For example, the response signal may include information about whether the coupled sound system 100 includes the noise removal unit 220.

In operation 660, the processor 340 or the audio processing unit 580 may identify whether it has sensed the PLC identifying response signal to the PLC identifying signal through the power line communication unit 510 of the external device. In response to having sensed the PLC identifying response signal, in operation 670, the processor 340 or the audio processing unit 580 may identify that the sound system 100 coupled through the power line communication unit 510 of the external device is a sound system supporting a PLC function, and enter into a power line data communication mode. However, in response to having failed to sense the response signal, in operation 680, the processor 340 or the audio processing unit 580 may identify that the sound system 100 coupled through the power line communication unit 510 of the external device is a sound system non-supporting the PLC function, and stop power supplying to the power line communication unit 210, thereby powering off the power line communication unit 210.

The PLC identifying response signal may be a pulse signal. The processor 340 or the audio processing unit 580 may sense the pulse signal transmitted through the power line communication unit 510 of the external device through the M-stage 130 from the sound system 100, thereby identifying that it has sensed the PLC identifying response signal.

Though not illustrated in the drawing, in response to sensing that the sound system supporting the PLC function is coupled, the processor 340 of the external device or the audio processing unit 580 may control a sound output direction of the external device 110, together with power supply and data communication through the power line communication unit 510 of the external device. For example, in response to the sound system 100 being coupled while the external device 110 is outputting a sound through a speaker phone, the processor 340 of the external device or the audio processing unit 580 may control the sound output direction in the direction of the coupled sound system 100.

Figure 7:
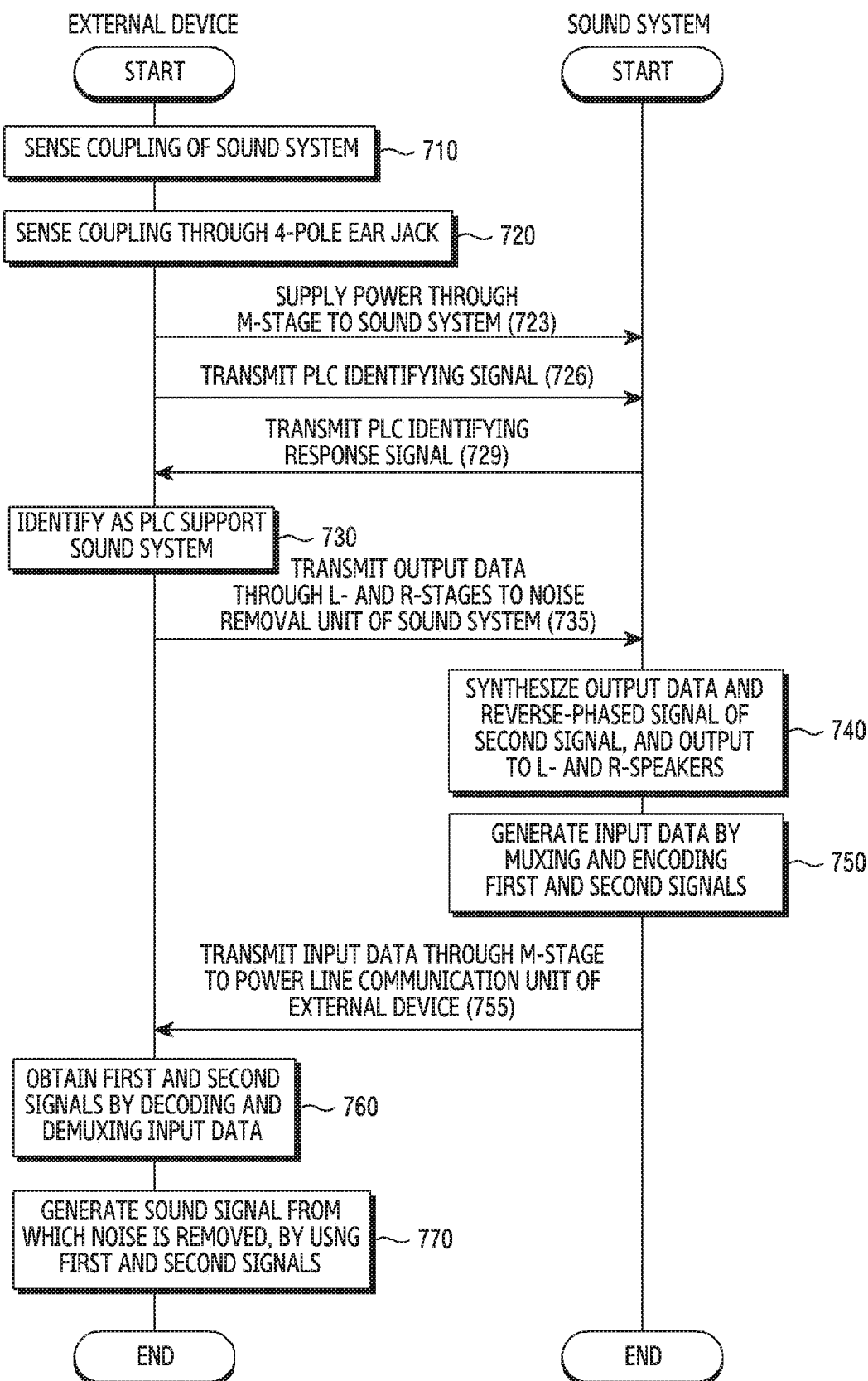
FIG. 7 is a mutual signal flowchart between a sound system and an external device for removing noise from a reception signal and a transmission signal, of an embodiment of the present disclosure.

FIG. 7 is a mutual signal flowchart between the sound system 100 and the external device 110 for removing noise from a reception signal and a transmission signal, of an embodiment of the present disclosure.

In operation 710, the processor 340 of the external device or the audio processing unit 580 may sense the coupling of the sound system 100. The sensing of the coupling of the sound system 100 may be performed by sensing, by the processor 340 or the audio processing unit 580, a variation of a voltage value of the L-stage 150. In operation 720, the processor 340 or the audio processing unit 580 may sense the coupling with the sound system 100 through the 4-pole ear jack 120. The sensing of the coupling through the 4-pole ear jack 120 may be performed by sensing, by the processor 340 or the audio processing unit 580, a variation of a voltage value of the M-stage 130.

Thereafter, the processor 340 of the external device or the audio processing unit 580 may supply power, through the M-stage 130 coupled to the power line communication unit 510 of the external device, to the sound system 100 (operation 723), and may transmit a signal identifying whether the coupled sound system 100 supports a PLC function (operation 726). In response to a PLC identifying signal, the sound system 100 may transmit a PLC identifying response signal to the external device 110 (operation 729). In operation 730, in response to receiving the PLC identifying response signal through the power line communication unit 510 of the external device, the processor 340 of the external device or the audio processing unit 580 may identify that the coupled sound system 100 is a PLC supporting sound system. Thereafter, the sound system 100 and the external device 110 enter into a state of being capable of performing power line data communication and noise removal.

Thereafter, by performing an RX ANC function, the sound system 100 and the external device 100 may output output data and a reverse-phased signal capable of removing noise. In detail, in operation 735, the processor 340 of the external device or the audio processing unit 580 may transmit the output data, through the R-stage 140 and L-stage 150 of the 4-pole ear jack 120, to the noise removal unit 220 of the sound system. And, in operation 740, the noise removal unit 220 of the sound system may apply a reverse-phased signal of the second signal through the second microphone 250, to the received output data, thereby providing output data, i.e., output data applying a reverse phase of external noise to a counterpart reception voice signal, through the R-speaker 260 and the L-speaker 270. As a result, a user may listen to a counterpart reception voice signal from which noise is removed. This is that a signal applied to user's ears is output data applying a reverse phase of external noise to a counterpart reception voice signal provided through the R-speaker 260 and the L-speaker 270 and a noise signal coming from the external, and a reverse-phased signal of a second signal and an external noise signal generate a mutual phase difference of 180 degrees, to remove noise, so the user is able to listen to only the counterpart reception voice signal.

In operation 740, the noise removal unit 220 of the sound system may apply an additional sound suitable to the external environment, in applying the reverse-phased signal of the second signal. For example, in response to a user's ear or a signal having a frequency profile for the R-speaker 260 and the L-speaker 270, it may apply the reverse-phased signal of the second signal with a criterion of a corresponding profile by varying a weight for each frequency.

The corresponding RX ANC operation (operation 740) of an embodiment of the present disclosure may be omitted. For example, in response to the noise removal unit not existing in the sound system, or in response to the RX ANC function being OFF, a corresponding operation may not be performed. Also, in accordance with another embodiment of the present disclosure, the corresponding RX ANC operation may be performed by the noise removal unit 520 of the external device, not the sound system as well.

Also, the sound system 100 and the external device 110 may perform a TX ANC function, to remove noise from a sound signal inputted to a microphone of the sound system 100. In detail, in operation 750, the power line communication unit 210 of the sound system may generate input data by multiplexing and encoding the first signal inputted to the first microphone 230 of the sound system and the second signal inputted to the second microphone 250. Thereafter, in operation 755, the power line communication unit 210 of the sound system may transmit the generated input data, through the M-stage 130, to the power line communication unit 510 of the external device. Thereafter, in operation 760, the power line communication unit 510 of the external device may decode and demultiplex the received input data, to obtain the first signal and the second signal. And, in operation 770, the noise removal unit 320 of the external device may generate a sound signal from which noise is removed by using the obtained first signal and second signal.

According to an embodiment of the present disclosure, the corresponding TX ANC procedure (operation 770) may be performed in response to the TX ANC function being ON. For example, in response to the TX ANC function being OFF, in operation 750, the power line communication unit 210 of the sound system does not include the second signal in input data. Also, the noise removal unit 420 of the external device does not perform operation 770. Also, in accordance with another embodiment of the present disclosure, the corresponding TX ANC operation may be performed by the noise removal unit 220 of the sound system, not the noise removal unit 320 of the external device.

Figure 8:
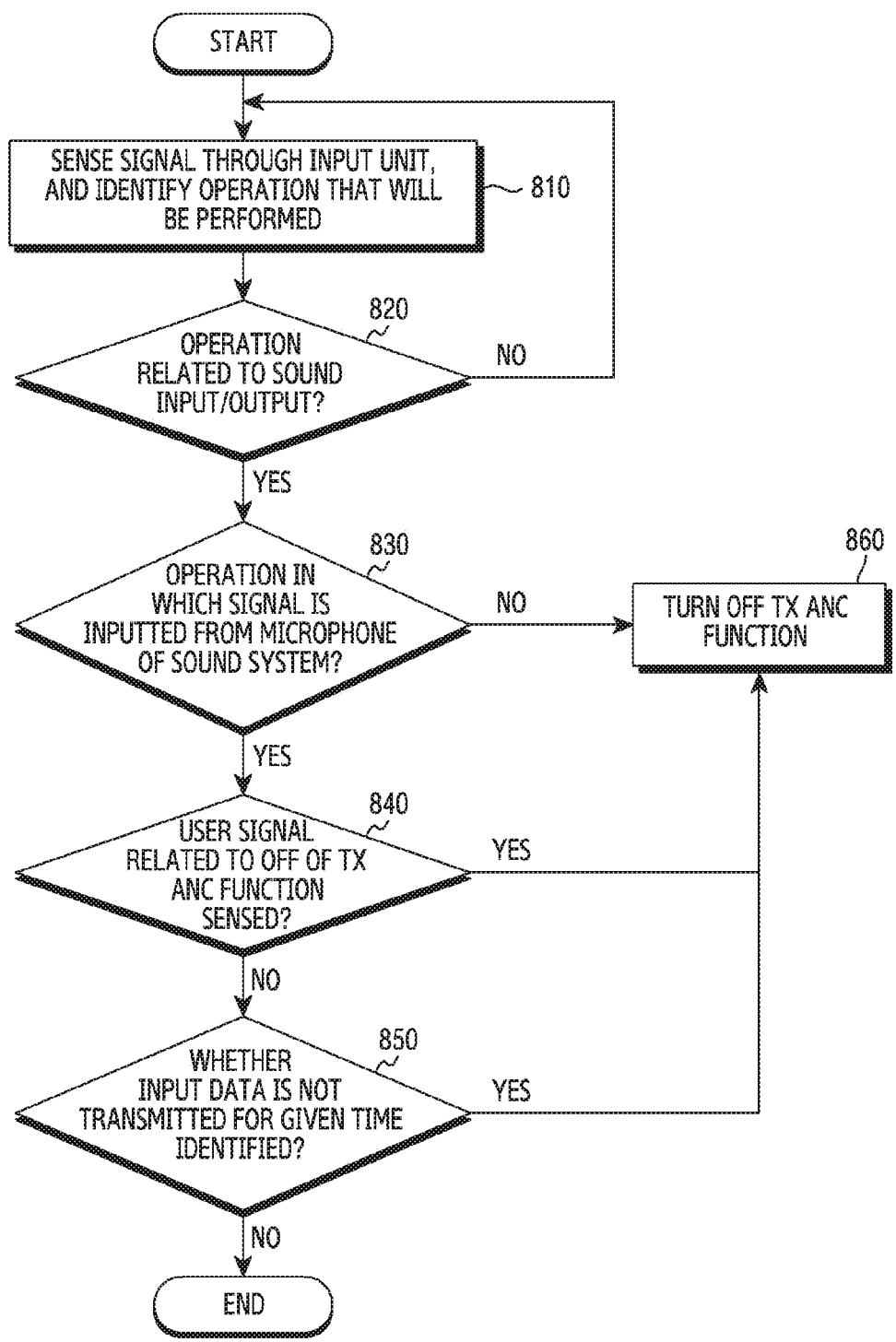
FIG. 8 is a flowchart illustrating an identifying sequence for controlling ON/OFF of a TX ANC function by a processor of an external device, of an embodiment of the present disclosure.

FIG. 8 is a flowchart illustrating an identifying sequence for controlling ON/OFF of a TX ANC function by the processor 340 of the external device, of an embodiment of the present disclosure.

The TX ANC function is for removing noise from a sound signal inputted from a microphone of the sound system 100, including a user's transmission voice. The TX ANC function may be ON/OFF according to the kind of an execution operation of the external device 110 and a user's input, etc. Also, suitable ON/OFF of the TX ANC function may be helpful for reducing a waste of power.

In operation 810, the processor 340 of the external device may sense a signal through the input unit 360 of the external device, and identify an operation related to the sensed signal. For example, in response to the processor 340 sensing a touch through a touch screen of a portable terminal, the processor 340 may identify that the sensed touch is a touch for execution of a specific application (e.g., voice record).

Thereafter, in operation 820, the processor 340 may identify whether the identified operation is an operation related to sound input/output. The operation related to the sound input/output may be a call, a game, music playing, recording, a voice command, voice translation, etc. For example, in response to a signal through the input unit 360 being the execution of a text memo, the processor 340 may repeat operation 820. That is, the processor 340 may repeat operation 810 and operation 820 until when sensing the signal related to the sound input/output.

In response to identifying that an operation to be performed is the operation related to the sound input/output, in operation 830, the processor 340 may identify whether it is an operation in which a sound is inputted from a microphone of the coupled sound system 100. In response to being an operation irrelevant to the sound input, in operation 860, the processor 340 may turn OFF the TX ANC function. For example, a game, music playing, etc. are operations related only to sound output, and a call, recording, etc. are operations related to sound input. For example, in response to the processor 340 sensing a signal for music playing, the processor 340 may identify that it is not the operation related to the sound input, and turn off the TX ANC function. For another example, in response to the processor 340 sensing a signal for a call, the processor may identify that it is the operation related to the sound input, and perform operation 840.

Even though identifying that it is the operation related to the sound input, the processor 340 may sense a user signal in operation 840, to turn OFF the TX ANC function in operation 860. That is, the processor 340 may sense a user's signal through the input unit 360 of the external device and a user's signal through the user interface unit 240 of the sound system, to turn OFF the TX ANC function. For example, in response to receiving a signal by a user interface turning OFF the TX ANC function from the power line communication unit 310, the processor 340 may turn OFF the TX ANC function.

The processor 340 may identify that it is the operation related to the sound input, and although a user's signal related to OFF of the TX ANC function is not sensed, in operation 860, may automatically turn OFF the TX ANC function according to a data transmission situation from the sound system 100. For example, in response to a first signal equal to or greater than a given magnitude not being received during a given time, the processor 340 may automatically turn OFF the TX ANC function. Here, the first signal may be a user's transmission voice signal inputted to the first microphone 230 of the sound system. Also, a criterion of identifying that the first signal is not received may be the existence of a meaningful difference between the first signal and the second signal, generated by the demultiplexing unit 325.

That is, in response to performing the operation related to the sound input/output, a user may select the applying or non-applying of the ANC function, thereby adoptively selecting accuracy or presence according to situation. Also, the external device 110 may automatically turn OFF the ANC function according to an operation type and a data reception situation, thereby preventing a waste of power.

Though not illustrated in the drawing, in response to an operation to which the ANC function is applicable being inputted through the input unit 360 in a situation in which the ANC function is OFF, the processor 340 may output a message that the ANC function has currently become OFF, or the ANC may automatically become ON. In accordance with a user's response to the message, the processor 340 may again turn on the ANC function or maintain an OFF state. In response to completing the execution of an operation to which the ANC function is applicable, the processor 340 may maintain an OFF state that is a previous state as well.

Figure 9:
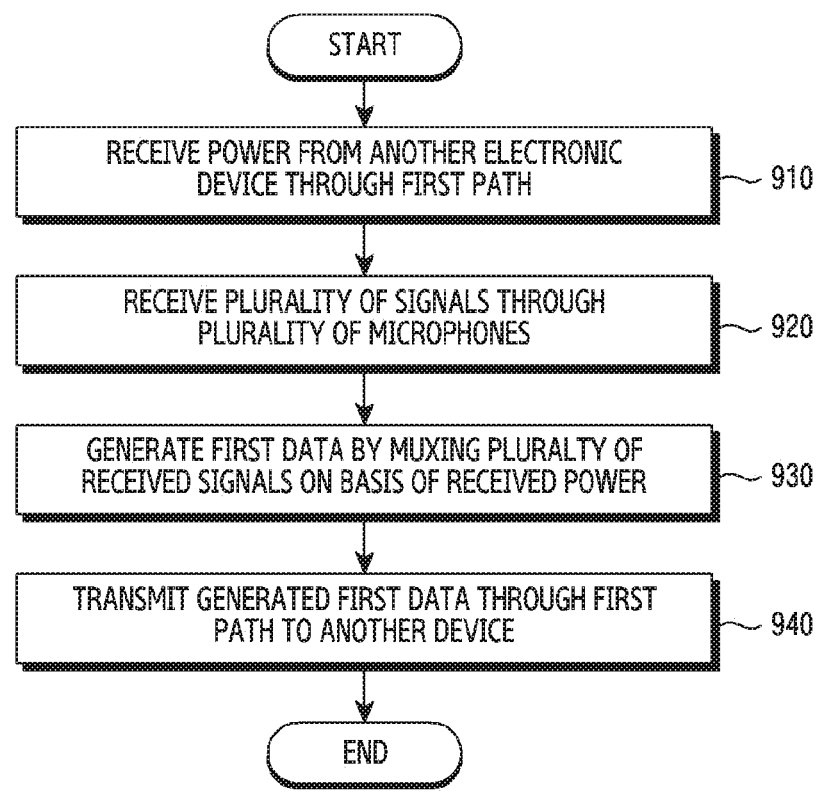
FIG. 9 is a flowchart illustrating a sequence for performing a TX ANC function by a sound system, of an embodiment of the present disclosure.

FIG. 9 is a flowchart illustrating a sequence for performing a TX ANC function by the sound system 100, of an embodiment of the present disclosure.

In operation 910, the sound system 100 may receive power from another electronic device through a first path. The another electronic device may be the external device 110 coupled to the sound system 100, and may be a portable terminal device. The first path may be a power line passing through the M-stage 130 of the 4-pole ear jack 120 coupling the sound system 100 and the another electronic device.

Also, in operation 920, the sound system 100 may receive a plurality of signals including at least one transmission signal through a plurality of microphones, on the basis of the received power. The plurality of microphones may include the first microphone 230 for recognizing a user's voice signal, etc., and the second microphone 250 for recognizing peripheral noise. Also, the plurality of signals may include a first signal received through the first microphone 230, and a second signal received through the second microphone 250. Also, the plurality of signals may include a signal by a user interface.

In operation 930, the sound system 100 may generate first data by multiplexing and encoding the plurality of signals on the basis of the received power. The generated first data may be input data multiplexing and encoding the plurality of signals including the peripheral noise by the power line communication unit 210 of the sound system.

Also, in operation 940, the sound system 100 may transmit the generated first data, through the first path, to the another device.

Through the sequence shown in the flowchart, even though a battery is not embedded within the sound system 100, the sound system 100 may receive power by using the existing standard 4-pole ear jack 120, and communicate data through the same path, thereby removing noise from a transmission signal.

Figure 10:
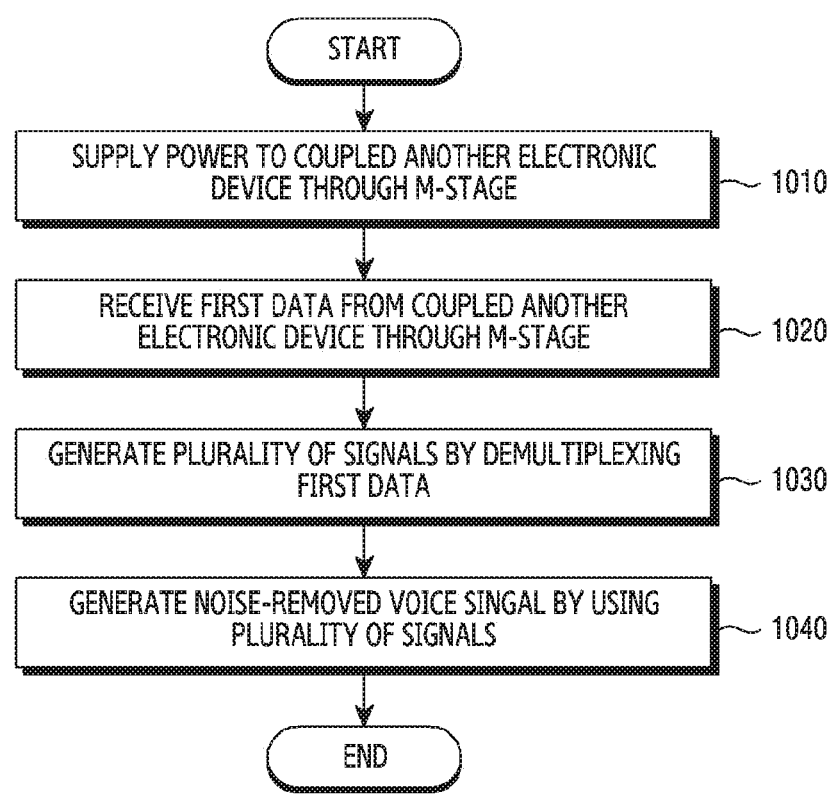
FIG. 10 is a flowchart illustrating a sequence for performing a TX ANC function by an external device, of an embodiment of the present disclosure.

FIG. 10 is a flowchart illustrating a sequence for performing a TX ANC function by the external device 110, of an embodiment of the present disclosure.

Here, the TX ANC means the removing of noise of a sound signal received by a microphone of a sound system.

In operation 1010, the external device 110 may supply power to another electronic device coupled with the external device 110 through the M-stage 130. The external device may be a portable terminal, and the another electronic device may be the sound system 100, for example, a headset or earphone. The M-stage 130 means a microphone terminal of the 4-pole ear jack 120 coupling the external device 110 and the another electronic device.

In operation 1020, the external device 110 may receive first data from the coupled another electronic device through the M-stage 130. Here, the first data may be input data muxing and encoding a plurality of signals including peripheral noise by the power line communication unit 210 of the another electronic device.

In operation 1030, the external device 110 may generate a plurality of signals by demultiplexing and decoding the received first data. The plurality of signals may include a user's transmission voice signal and peripheral noise, and may additionally include a signal by a user interface.

In operation 1040, the external device 110 may generate a voice signal from which noise is removed by using the generated plurality of signals. That is, the external device 110 may apply a reverse-phased signal of peripheral noise to the user's transmission voice signal, thereby removing noise included in the transmission voice signal. At this time, in applying the reverse-phased signal to the transmission voice signal, an additional sound adapted to the external environment may be applied. For example, it may add a delay value which may be generated by a difference of a microphone location between the first signal received by the first microphone and the second signal received by the second microphone, to apply the reverse-phased signal of the second signal.

Through the sequence shown in the flowchart, the external device 110 may supply power to the sound system 100 coupled to the external device 110, and communicate data through the same path, thereby removing noise from a transmission signal received by the sound system 100 not embedded with the battery by using the existing 4-pole ear jack 120.

Figure 11:
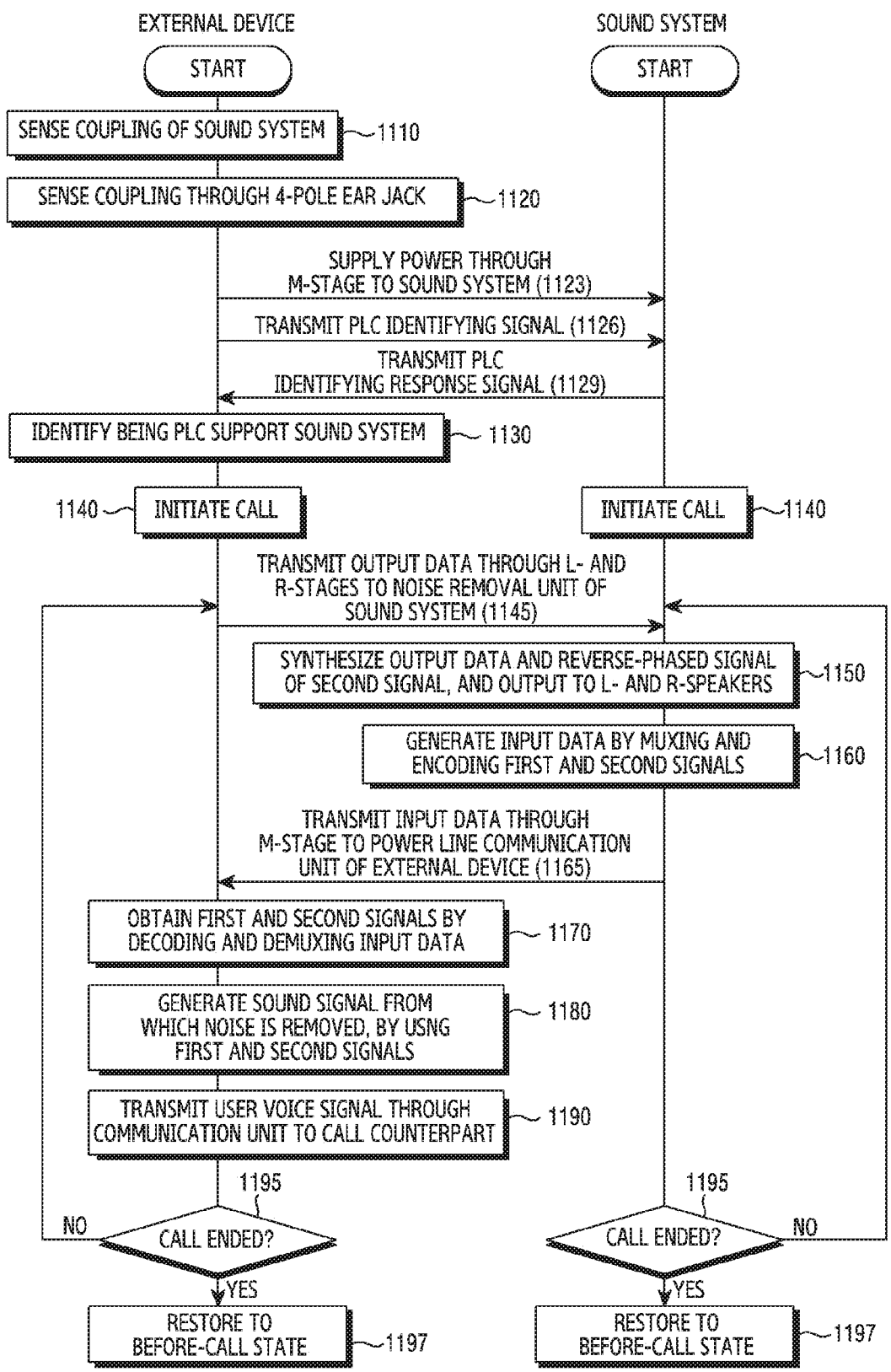
FIG. 11 is a mutual signal flowchart between a sound system and an external device in performing a call, of an embodiment of the present disclosure.

FIG. 11 is a mutual signal flowchart between the sound system 100 and the external device 110 in performing a call, of an embodiment of the present disclosure.

In operation 1110, the processor 340 of the external device or the audio processing unit 580 may sense the coupling of the sound system 100. The sensing of the coupling of the sound system 100 may be performed by sensing, by the processor 340 or the audio processing unit 580, a variation of a voltage value of the L-stage 150. In operation 1120, the processor 340 or the audio processing unit 580 may sense the coupling with the sound system 100 through the 4-pole ear jack 120. The sensing of the coupling through the 4-pole ear jack 120 may be performed by sensing a variation of a voltage value of the M-stage 130 by the processor 340 or the audio processing unit 580. For example, in case of the 3-pole ear jack, the M-stage 130 and the G-stage 135 are coupled with each other and thus the M-stage 130 becomes a ground level and thus recognition is possible. In case of the 4-pole, it may recognize being a value not the ground level and distinguish as well.

Thereafter, through the power line communication unit 510 of the external device, in operation 1123, the processor 340 of the external device or the audio processing unit 580 may supply power, through the M-stage 130, to the sound system and, in operation 1126, may transmit a PLC identifying signal of identifying whether the coupled sound system 100 supports a PLC function. In operation 1129, in response to the PLC identifying signal, the sound system 100 may transmit a PLC identifying response signal to the external device 110. In response to receiving the PLC identifying response signal through the power line communication unit 510 of the external device, in operation 1130, the processor 340 of the external device or the audio processing unit 580 may identify that the coupled sound system 100 is a PLC supporting sound system. Thereafter, the sound system 100 and the external device 110 gets into a state of being capable of performing power line data communication and noise removal. In operation 1140, a call is initiated.

After the call is initiated, the sound system 100 and the external device 110 may perform an RX ANC function, to remove noise from a reception voice signal, that is, a counterpart's voice signal. In detail, in operation 1145, the processor 340 of the external device or the audio processing unit 580 may transmit output data, i.e., the counterpart's voice signal, through the R-stage 140 and the L-stage 150 of the 4-pole ear jack 120, to the noise removal unit 220 of the sound system. And, in operation 1150, the noise removal unit 220 of the sound system may generate a signal synthesizing a reverse-phased signal of the second signal to the received output data. Also, by outputting the generated signal through at least one speaker, a user may actually hear, with ears, only the counterpart reception voice signal from which external noise is removed.

Also, the sound system 100 and the external device 110 may perform a TX ANC function, to remove noise from a transmission voice signal. In operation 1160, the power line communication unit 210 of the sound system may generate input data by multiplexing and encoding a first signal (e.g., a transmission voice) and a second signal (e.g., peripheral noise) inputted to a microphone of the sound system. Thereafter, in operation 1165, the power line communication unit 210 of the sound system may transmit the generated input data, through the M-stage 130, to the power line communication unit 310 of the external device. In operation 1170, the power line communication unit 310 of the external device may decode and demultiplex the received input data, to obtain the first signal and the second signal. And, in operation 1180, the power line communication unit 410 of the external device may generate a transmission voice signal from which noise is removed by using the obtained first and second signals. Thereafter, in operation 1190, the processor 340 of the external device may transmit the generated user transmission voice signal to a call counterpart through the communication unit 370.

In operation 1195, the sound system 100 and the external device 110 may identify whether the call is ended. In response to the call not being ended, the sound system 100 and the external device 110 may repeat operation 1140 to operation 1195. That is, in response to the call being in progress, the both devices repeatedly perform power line data communication and noise removal, thereby continuously removing noise from a reception voice and a transmission voice during the call.

A method for operating in an electronic device according to various embodiments of the present disclosure may include receiving power from an external electronic device through a first path, receiving a plurality of signals including transmission signals from a plurality of microphones, using the received power, and generating first data by multiplexing and encoding the plurality of received signals, using the received power, and transmitting the generated first data, through the first path, to the external electronic device.

According to various embodiments, the method may further include receiving a transmission signal by at least one of the plurality of microphones, and receiving peripheral noise by another at least one of the plurality of microphones.

According to various embodiments, the method may further include generating at least one output data by removing noise from at least one reception signal received through at least one second path from the external electronic device, using power provided from the external electronic device through the first path and transmitting the generated at least one output data to at least one speaker.

According to various embodiments, the method may further include generating the first data by multiplexing a signal by a user interface with the plurality of signals.

According to various embodiments, the signal by the user interface may include at least any one of signals of an increase or decrease of a volume, a movement of a music track, and turning on or off a function of removing noise.

A method for operating in an electronic device of various embodiments of the present disclosure may include supplying power through a first path to an external electronic device, generating a plurality of signals including transmission signals by demultiplexing and decoding first data received through the first path from the external electronic device, and generating at least one sound signal by removing noise from the transmission signals.

According to various embodiments, the method may further include, in response to the external electronic device being coupled to the electronic device, identifying the number of poles of an ear jack which is inserted into a set slot of the electronic device, and identifying whether the external electronic device is a device supporting a function of power line communication through the first path, on the basis of the identified number of poles of the ear jack.

According to various embodiments, the method may include, in response to being identified that the external electronic device is the device supporting the function of power line communication through the first path, supplying power to the external electronic device through the first path.

According to various embodiments, the plurality of signals may further include a signal by a user interface.

According to various embodiments, the method may further include sensing coupling with the external electronic device by at least any one of an ear jack or a USB type interface.

According to various embodiments, the method may include, in response to being an ear jack not supporting a PLC function, performing, by the external device, the same operation as the existing ear phone operation like a bypass mode of the power line communication unit.

According to various embodiments, a first signal (e.g., L signal, R signal) inputted to a plurality of microphones of the sound system may be a plurality of signals capable of being divided using a location difference of the microphones.

Meantime, in a detailed description of the present disclosure, a concrete embodiment has been described, but it is undoubted that various modifications are available without departing from the scope of the present disclosure. Therefore, the scope of the present disclosure should not be limited and defined to the described embodiment and should be defined by not only claims described later but also equivalents to these claims.

What is claimed is:

1. A headset device comprising:
a control circuit; and
a plurality of microphones operatively coupled with the control circuit,
wherein the control circuit is configured to:
receive, from an external device, power through a first path,
receive, from the external device, a signal identifying if the headset device supports a power line communication (PLC) operation,
in response to the PLC identifying signal, transmit a PLC response signal to the external device,
generate first data by multiplexing a plurality of signals comprising transmission signals from the plurality of microphones, using the received power, and
transmit the generated first data, through the first path, to the external electronic device.

2. The device of claim 1, wherein at least one of the plurality of microphones is configured to receive a transmission signal, and another at least one of the plurality of microphones is configured to receive peripheral noise.

3. The device of claim 1, further comprising at least one speaker operatively coupled with the control circuit,
wherein the control circuit is configured to:
generate at least one output data by synthesizing at least one noise removal signal for removing peripheral noise, with at least one reception signal received through at least one second path from the external electronic device, using the power provided from the external electronic device through the first path, and
transmit the generated at least one output data to the at least one speaker.

4. The device of claim 1, wherein the control circuit is configured to generate the first data by multiplexing a signal by a user interface with the plurality of signals.

5. The device of claim 4, wherein the signal by the user interface comprises at least any one of signals of an increase or decrease of a volume, a movement of a music track, and turning ON or OFF a function of removing noise.

* * * * *